United States Patent
Kurosawa et al.

(10) Patent No.: US 10,430,176 B2
(45) Date of Patent: Oct. 1, 2019

(54) IN-VEHICLE CONTROL DEVICE, PROGRAM UPDATE SYSTEM, AND PROGRAM UPDATE SOFTWARE

(71) Applicant: Hitachi Automotive Systems, Ltd., Hitachinaka-shi, Ibaraki (JP)

(72) Inventors: Kenichi Kurosawa, Hitachinaka (JP); Fumiharu Nakahara, Hitachinaka (JP); Hidetoshi Teraoka, Tokyo (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/757,194

(22) PCT Filed: Sep. 21, 2016

(86) PCT No.: PCT/JP2016/077760
§ 371 (c)(1),
(2) Date: Mar. 2, 2018

(87) PCT Pub. No.: WO2017/057111
PCT Pub. Date: Apr. 6, 2017

(65) Prior Publication Data
US 2018/0246711 A1    Aug. 30, 2018

Related U.S. Application Data

(63) Continuation-in-part of application No. 14/938,940, filed on Nov. 12, 2015, now abandoned, which is a
(Continued)

(30) Foreign Application Priority Data

Sep. 29, 2015    (JP) .................................. 2015-190627

(51) Int. Cl.
*G06F 8/658* (2018.01)
*G06F 8/65* (2018.01)
(Continued)

(52) U.S. Cl.
CPC ................ *G06F 8/65* (2013.01); *B60K 35/00* (2013.01); *G06F 8/658* (2018.02); *G06F 11/1004* (2013.01)

(58) Field of Classification Search
None
See application file for complete search history.

(56) References Cited

U.S. PATENT DOCUMENTS

2006/0200502 A1    9/2006 Tanaka et al.
2006/0259207 A1    11/2006 Natsume
(Continued)

FOREIGN PATENT DOCUMENTS

EP    1 589 430 A1    10/2005
EP    2 575 035 A1    4/2013
(Continued)

OTHER PUBLICATIONS

International Search Report (PCT/ISA/210) issued in PCT Application No. PCT/JP2016/077760 dated Dec. 13, 2016 with English translation (Four (4) pages).
(Continued)

*Primary Examiner* — Daxin Wu
(74) *Attorney, Agent, or Firm* — Crowell & Moring LLP

(57) ABSTRACT

Provided is an in-vehicle control device which makes it possible to achieve restoration processing of differential reprogramming even in an in-vehicle control device using a microcomputer with a built-in flash memory using a small amount of RAM and composed of large blocks, and is capable of restoring a new program in a short time by decreasing the size of differential data even for a new program to which major changes have been made. Provided is an in-vehicle control device capable of updating a program on the basis of update content provided from an update tool, the in-vehicle control device being provided with a first
(Continued)

memory provided with a plurality of blocks for storing programs, and a second memory. When updating a program, differential data of the program and an update program are stored in the second memory, an update program for a block to be updated among the plurality of blocks is recreated in another block which is different from the block to be updated using the differential data and an old program, and the update program which has been recreated in the other block is written in the block to be updated.

17 Claims, 17 Drawing Sheets

Related U.S. Application Data continuation-in-part of application No. 14/729,322, filed on Jun. 3, 2015, now abandoned, and a continuation-in-part of application No. 14/729,278, filed on Jun. 3, 2015, now abandoned, application No. 15/400,462, which is a continuation-in-part of application No. 14/543,030, filed on Nov. 17, 2014, now Pat. No. 9,589,107, and a continuation-in-part of application No. 14/543,066, filed on Nov. 17, 2014, now Pat. No. 9,585,616.

(51) Int. Cl.
*B60K 35/00* (2006.01)
*G06F 11/10* (2006.01)

(56) References Cited

U.S. PATENT DOCUMENTS

| | | | |
|---|---|---|---|
| 2007/0169080 A1* | 7/2007 | Friedman | G06F 8/65 717/168 |
| 2008/0005733 A1* | 1/2008 | Ramachandran | G06F 8/65 717/168 |
| 2011/0082995 A1* | 4/2011 | Enomoto | G06F 12/0246 711/166 |
| 2013/0080580 A1 | 3/2013 | Nagai et al. | |
| 2015/0026675 A1* | 1/2015 | Csaszar | G06F 8/61 717/178 |
| 2017/0060559 A1* | 3/2017 | Ye | G06F 8/65 |

FOREIGN PATENT DOCUMENTS

| | | |
|---|---|---|
| EP | 3 252 605 A1 | 12/2017 |
| JP | 2004-234503 A | 8/2004 |
| JP | 2007-528071 A | 10/2007 |
| JP | 2011-81561 A | 4/2011 |
| JP | 2012-190075 A | 10/2012 |
| JP | 2013-73417 A | 4/2013 |
| WO | WO 2005/085997 A2 | 9/2005 |
| WO | WO 2016/121442 A1 | 8/2016 |

OTHER PUBLICATIONS

Japanese-language Written Opinion (PCT/ISA/237) issued in PCT Application No. PCT/JP2016/077760 dated Dec. 13, 2016 (Five (5) pages).
European Search Report issued in counterpart European Application No. 16851285.3 dated May 8, 2019 (13 pages).

* cited by examiner

FIG. 1
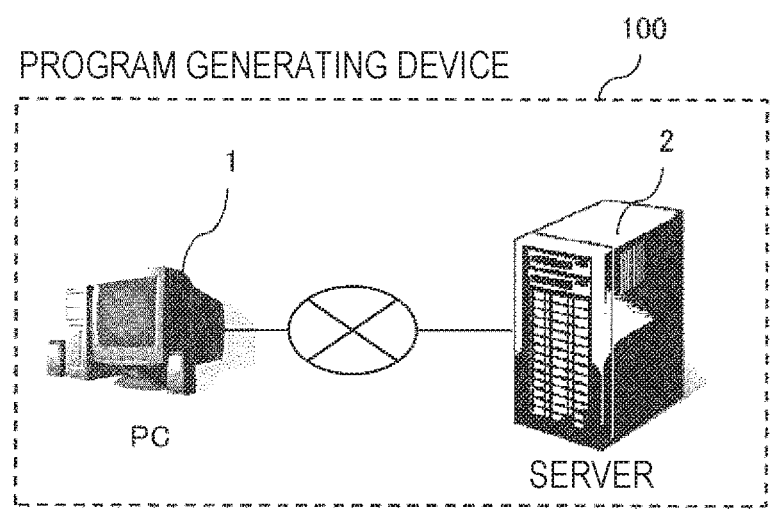
PROGRAM GENERATING DEVICE 100
PC 1
SERVER 2
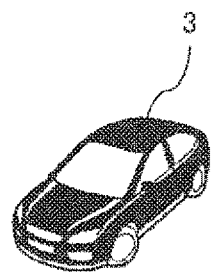
IN-VEHICLE SYSTEM 3

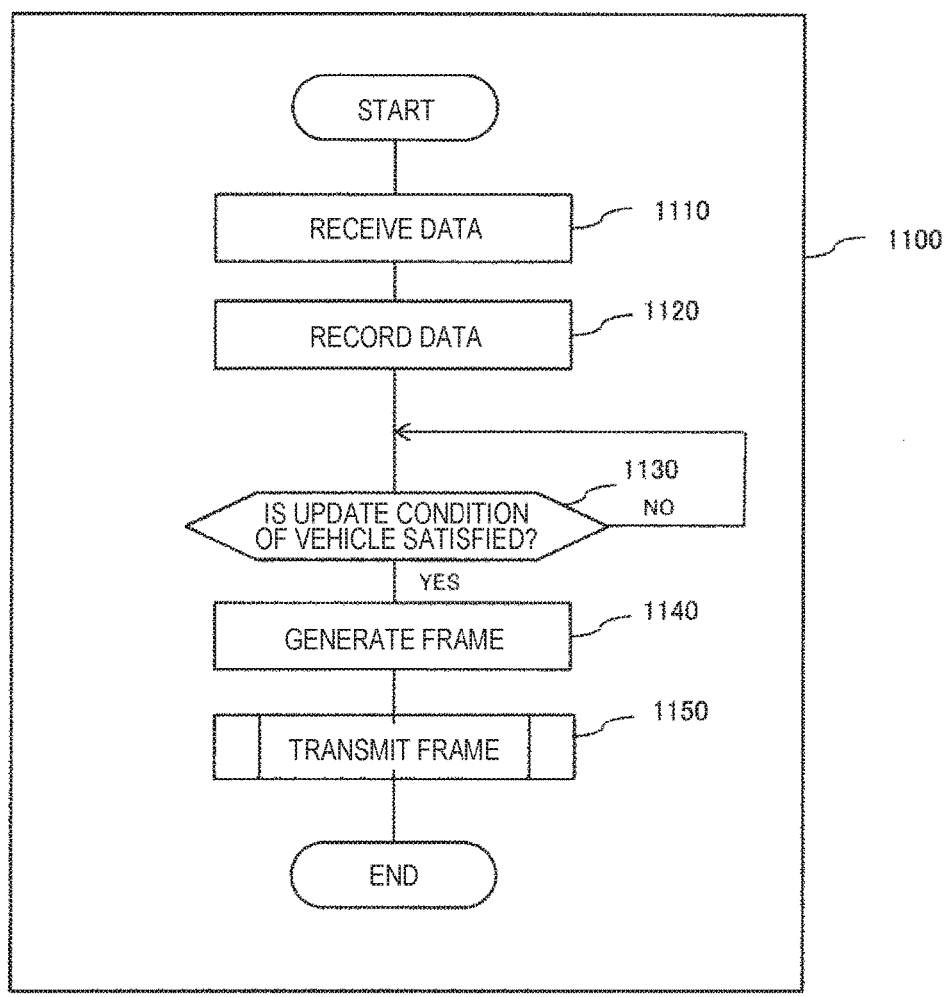

FIG. 12A  DOWNLOAD FRAME
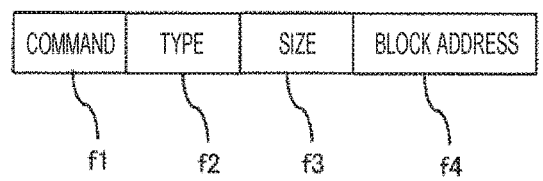
FIG. 12B  TRANSFER DATA FRAME
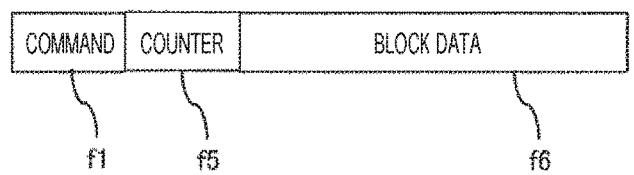
FIG. 12C  DOWNLOAD END FRAME

EXISTING ECU
CONFIGURATION

RESTORATION RECOVERY
SOFTWARE DOWNLOAD

DIFFERENTIAL
UPDATE

RESTORATION RECOVERY
SOFTWARE PORTION UPDATE

IN-VEHICLE CONTROL DEVICE, PROGRAM UPDATE SYSTEM, AND PROGRAM UPDATE SOFTWARE

TECHNICAL FIELD

The present invention relates to an in-vehicle control device, a program writing device, a program generating device, and a program.

BACKGROUND ART

For conventional reprogramming, a Personal Computer (PC) as a writing tool is connected via a low-speed CAN (Controller Area Network) to an in-vehicle control device (ECU: Engine Control Unit), and a load module (new program) is written to a flash memory of the ECU while dividing and transferring the load module.

Even when the update part for the new program is small with respect to the old program is small, the entire new program is transferred via the CAN and the entire new program is written.

Therefore, there is a problem that writing takes time. On the other hand, an idea of differential reprogramming has been conventionally proposed (see, for example, PTL 1). That is, in paragraph [0019] of PTL 1, "means for creating differential data between old and new programs in block units" is described as a way of rewriting. In addition, in paragraph [0064], a block to be updated of the old program is transferred to an SDRAM, the new program is restored to the SDRAM by using the differential data and the old program, the block to be updated is erased, and the new program is then written.

PTL 2 describes, in paragraph [0006], means for achieving differential update using a small amount of RAM. Instead of transferring a block to be updated o the old program to a RAM, the block is transferred to another block of the flash memory. That is, the block to be updated is erased after transferring the old program, the new program is restored using the differential data and the transferred old program, and the new program is written to the block to be updated. By repeating this processing for all blocks to be updated, the new program can be written to the flash memory. However, when there is a new program to be written to another block, the conventional update using full-text data is performed since the old program has already been erased.

In this way, a technique for realizing differential reprogramming even using a small amount of RAM has been developed.

CITATION LIST

Patent Literature

PTL 1: JP 2012-190075 A
PTL 2: JP 2011-81561 A

SUMMARY OF INVENTION

Technical Problem

In the technique of PTL 1, the old program of the block to be updated, the differential data, and the restored new program are all arranged on the RAM. As a result, in the in-vehicle control device using a microcomputer having a built-in flash memory composed of blocks larger than the RAM capacity, differential restoration is not possible in principle. In addition, the differential data of the new program is generated from the old program arranged in the same block. Thus, there is a problem that the size of the differential data is large. When the size of the differential data increases, the transfer time of the differential data to the in-vehicle control device is long, and the update time is long as a result.

Hereinafter, detailed description will be provided. In the means for creating differential data described in paragraph [0019] of PTL 1, the differential data of the new program arranged in the block to be updated is generated by using the old program arranged in the same block to be updated. In general, in order to reduce the differential data size, in differential extraction processing of differential data, a sub-string similar to a sub-string of a new program (partial instruction string) is retrieved from the old program and the sub-string is replaced with a copy command or the like. Meanwhile, a newly added sub-string does not usually exist in an old program. In this case, a new sub-string is stored by an add command. The copy command, the add command, and the stored new sub-string are differential data. From this point of view, it is a problem that the range to search for a similar sub-string is limited to one block. This is because it can be considered that the size of the differential data can be small by searching the old program of a range as wide as possible to find more similar sub-strings, and replacing them with copy commands.

According to the method described in PTL 2, the used amount of RAM can be decreased in differential update. As described above, first, another block that is different from the block to be updated is selected, the selected block is erased, and the old program in the block to be updated is transferred to the selected block. Next, the block to be updated is erased, and the new program generated from the differential data in the RAM and the old program of the selected block is written to the block to be updated. By using another block of the flash memory in this manner, the used amount of RAM is decreased.

However, it can be seen that the restoration processing of this method restores the new program only from the differential data and the old program of the selected block. This means that, even when generating differential data, the old program in the range of one block that is the same as the new program of the block to be updated is searched for a similar sub-string. Therefore, in the sense that the search range is narrow, there is a problem that the size of the differential data is large. Of course, when change between the old program and the new program is small, the search range of the old program cannot be said to be narrow. However, when there are major changes, it can be said that a similar sub-strings can be found easily by extending the search range in the old program.

An object of the present invention is to provide an in-vehicle control device, a program update system, and program update software which make it possible to achieve restoration processing of differential reprogramming even in an in-vehicle control device using a microcomputer having a built-in flash memory using a small amount of RAM and composed of large blocks, and are capable of restoring a new program in a short time by decreasing the size of differential data even for a new program to which major changes have been made.

Solution to Problem

The present invention is an in-vehicle control device capable of updating a program based on update content provided from an update tool, the in-vehicle control device includes a first memory provided with a plurality of blocks for storing the program and a second memory, stores differential data between the program and the update program in the second memory when updating the program, recreates the update program for a block to be updated among the plurality of blocks in another block that is different from the block to be updated using the differential data and old programs before the update, and writes the update program recreated in the another block that is different from the block to be updated to the block to be updated.

Advantageous Effects of Invention

According to the present invention, in an in-vehicle control device including a microcomputer with a built-in flash memory having a small SRAM and large blocks, differential update can be performed speedily and easily even for a new program to which major changes have been made. Problems, configurations, and effects other than the above will be clarified from the description of the embodiments below.

BRIEF DESCRIPTION OF DRAWINGS

FIG. 1 is a schematic diagram illustrating the overall configuration of a system according to an embodiment of the present invention.

FIG. 10 is a flowchart of communication software of a server illustrated in

FIG. 1.

FIG. 11 is a flowchart of communication software of a program writing device illustrated in FIG. 3.

FIGS. 12A to 12C illustrate a communication frame configuration of an in-vehicle network CAN connecting the program writing device and an in-vehicle control device illustrated in FIG. 3.

DESCRIPTION OF EMBODIMENTS

Figure 2:
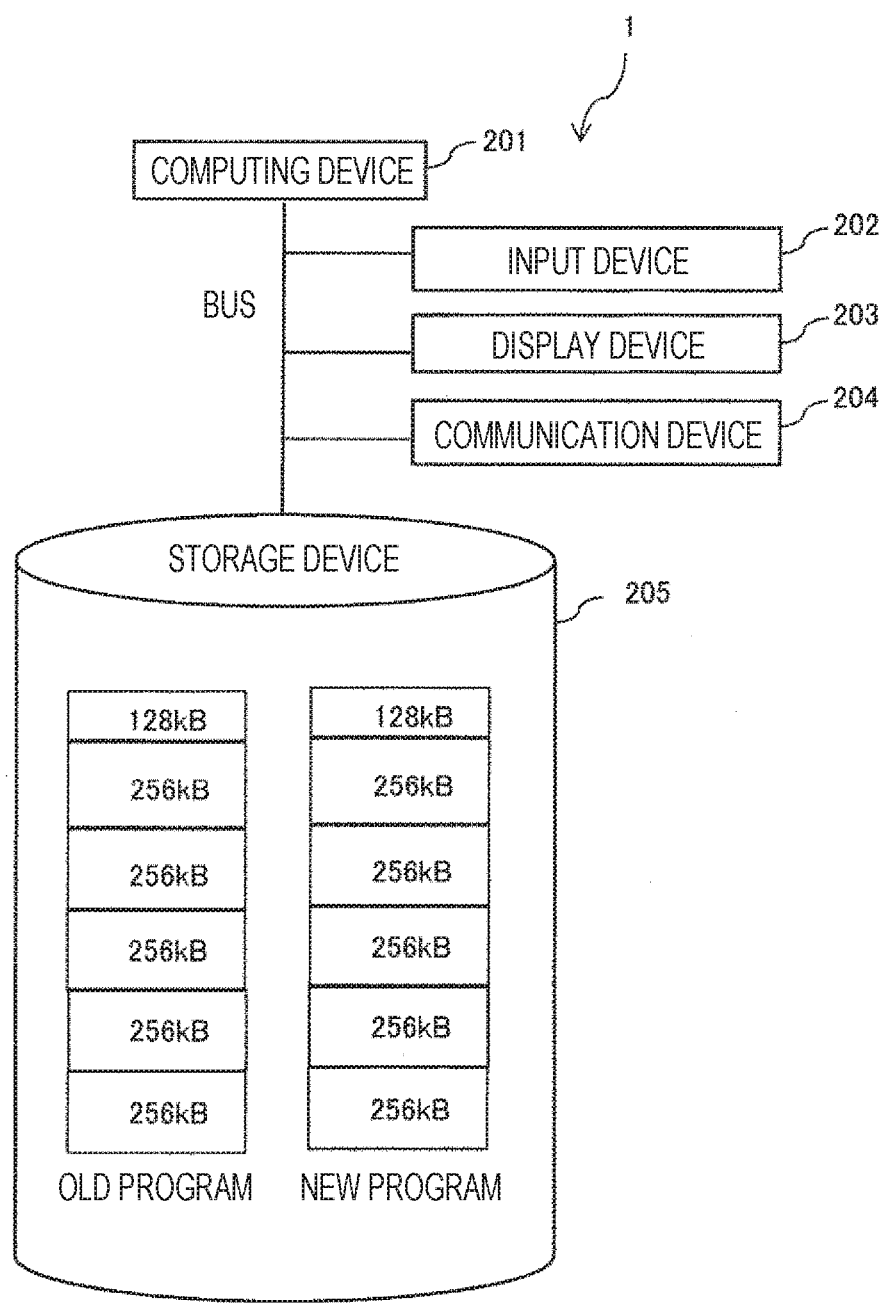
FIG. 2 is a configuration diagram of a PC illustrated in FIG. 1.

The present embodiment provides means for simultaneously achieving the following two objects.

The first object is to enable differential update even in a microcomputer with a built-in flash memory with a small RAM capacity and large blocks.

The second object is to decrease the size of the differential data as much as possible even for a new program to which major changes have been made.

A method for achieving the above two objects will be described. First, in order to restore a new program in a block to be updated, another block that is different from the block to be updated is secured in a flash memory and erased. Here, the another block will be referred to as a temporary block. The in-vehicle control device restores a new program from the received differential data on the RAM and old programs arranged in a plurality of blocks including the block to be updated, and writes the new program to the temporary block. Next, after writing to the temporary block is completed, the block to be updated is erased and the new program in the temporary block is written to the block to be updated. By repeatedly performing this processing for all blocks to be updated, update to the new program by differential update can be performed. It should be noted here that when there is a new program to be written in a temporary block, differential update is not possible because the old program has already been erased. In the present invention, as the new program to be written of the temporary block, compressed data obtained by compressing the new program itself is used. When decompressing the compressed data, the old program need not be referred. Alternatively, the compressed data may be differential from predetermined data such as all 0 or all 1. Also in this case, the old program need not be referred at the time of restoration. As described above, the compressed data is transmitted to the in-vehicle control device by using compressed data of the new program of the temporary block. The in-vehicle control device provides a unit for decompressing the received compressed data to restore the new program and write the new program to the temporary block.

As described above, the temporary block of the flash memory is used for restoring the new program. Thus, only a receiving area for receiving the differential data or the compressed data of the RAM is used.

The other object is achieved by the means for "restoring the new program from the differential data and the old programs arranged in a plurality of blocks including the block to be updated, and writing the new program to the temporary block". The reason will be described in detail below. In order to describe simply, a case where major function addition is made to the new program will be considered. In this case, a program that realizes the new function is added to a block somewhere in the new program. Roughly speaking, from the block to which the new function is arranged as a reference, new programs in blocks before the reference having upper addresses are almost the same as old programs, and new programs in blocks after the reference having lower addresses move to blocks respectively having addresses lower than those before the function addition by one due to insertion of the new function program. As a result, the differential data between the new program and old program in the same block can be decreased in size for the same blocks before the reference having upper addresses. However, for blocks after the reference having lower addresses, similar programs are in blocks that are shifted by one, and thus, the size of differential data in the same blocks is large. Therefore, in the present invention, the differential data of the new program of the block to be updated is generated using old programs in a larger range of a plurality of blocks including the block to be updated. Thus, a similar old program can be found even from a block shifted by one, resulting in decreased differential data.

By using the above-described method, even in an in-vehicle control device using a microcomputer with a built-in flash memory using a small amount of RAM and composed of large blocks, differential update is enabled and high-speed differential reprogramming is possible even for a new program to which major changes have been made. Details will be described in detail below with reference to the drawings.

Hereinafter, the configuration and operation of a system including the in-vehicle control device according to the embodiment of the present invention will be described with reference to the drawings.

First, the overall configuration of the system will be described with reference to FIG. 1. FIG. 1 is a schematic diagram illustrating the overall configuration of the system according to the embodiment of the present invention.

This system includes a program generating device 100 and an in-vehicle system 3.

The program generating device 100 generates data from a new program and the same program as a program stored in the in-vehicle control device included in the in-vehicle system 3, and transmits the generated data to the in-vehicle system 3. Detail of the processing will be described below with reference to FIGS. 7 to 11.

The program generating device 100 includes a PC 1 and a server 2. The PC 1 is connected to the server 2 via, for example, a Local Area Network (LAN). Note that the PC 1 and the server 2 may be connected directly using a cross cable.

The program generating device 100 communicates with the in-vehicle system 3 wirelessly. Communication is performed via, for example, the Internet, a cellular phone network, a wireless LAN, or the like. In FIG. 1, in order to make the drawing easier to see, relay devices such as routers or access points are not illustrated.

The in-vehicle system 3 receives data from the program generating device 100, and updates the program of the in-vehicle control device included in the in-vehicle system 3 based on the received data. Details of the processing will be described below with reference to FIGS. 11 to 15.

Next, the configuration of the PC 1 will be described with reference to FIG. 2. FIG. 2 is a configuration diagram of the PC 1 illustrated in FIG. 1.

The PC 1 includes a computing device 201 such as a Central Processing Unit (CPU), an input device 202 such as a keyboard and a mouse, a display device 203 such as a Liquid Crystal Display (LCD), a communication device 204 such as a Network Interface Card (NIC), and a storage device 205 such as a Random Access Memory (RAM), a Read Only Memory (ROM), or a Hard Disk Drive (HDD). The computing device 201, the input device 202, the display device 203, and the communication device 204 are connected to a bus.

The storage device 205 stores an old program that is the same as the program stored in the flash memory of the in-vehicle control device included in the in-vehicle system 3 and a new program obtained by updating the old program. The old program and the new program are illustrated such that they are arranged in blocks of the flash memory of the microcomputer of the in-vehicle control control device. That is, the new program and the old program each includes a head program arranged in a top block of 128 kB and programs arranged in sequential five blocks of 256 kB.

The configuration of the server 2 illustrated in FIG. 1 is similar to that of the PC 1. That is, the server 2 includes a computing device 201S, an input device 202S, a display device 203S, a communication device 204S, and a storage device 205S.

Figure 3:
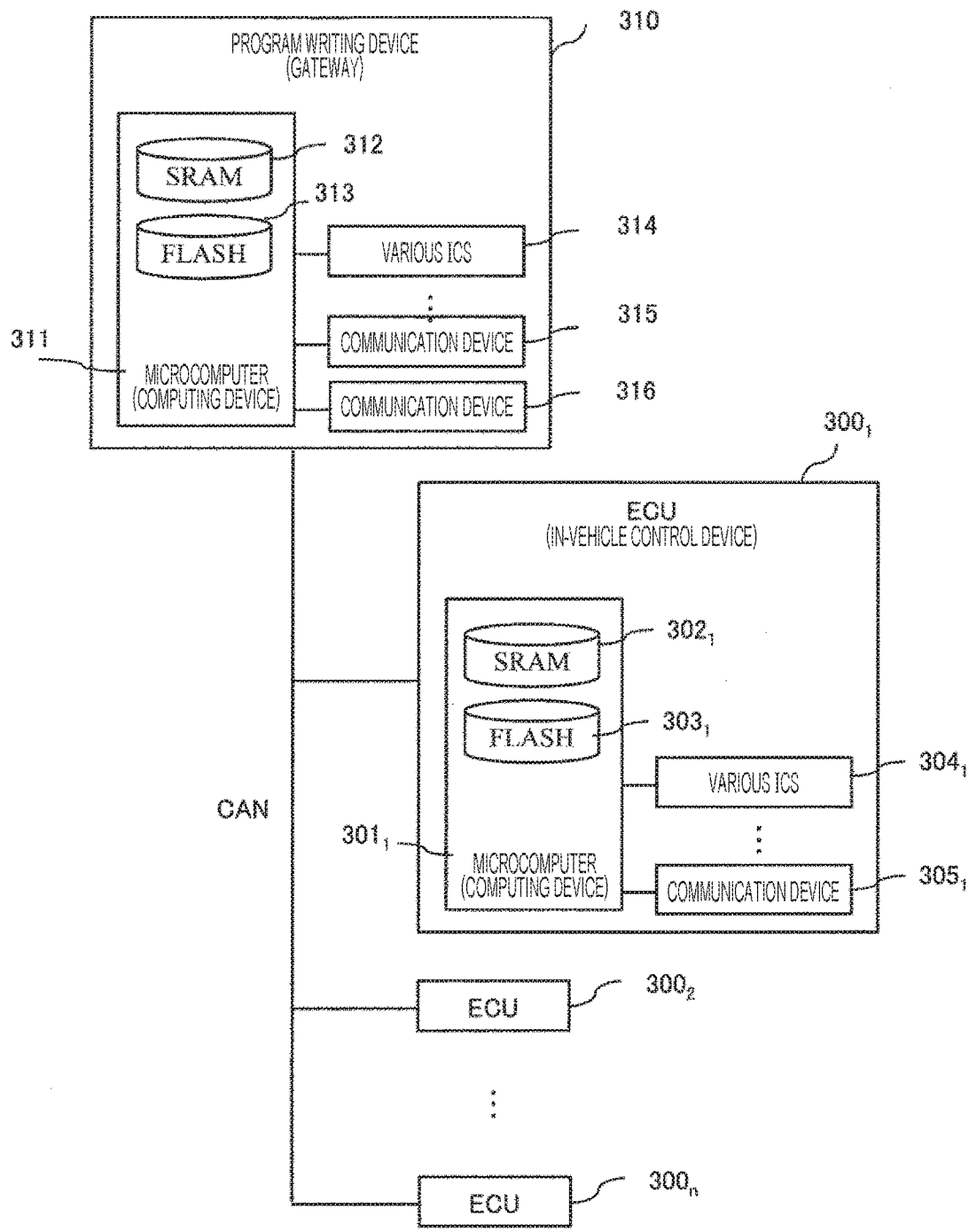
FIG. 3 is a configuration diagram of an in-vehicle system illustrated in FIG. 1.

Next, the configuration of the in-vehicle system 3 will be described with reference to FIG. 3. FIG. 3 is a configuration diagram of the in-vehicle system 3 illustrated in FIG. 1.

The in-vehicle system 3 includes a program writing device 310 (gateway) and a plurality of ECUs 300 ($300_1$ to $300_n$). The program writing device 310 and the ECUs 300 communicate with each other via an in-vehicle network CAN.

When authentication is successful, the program writing device 310 relays data between the network outside the vehicle and the CAN inside the vehicle.

The ECU 300 includes a microcomputer 301 various Integrated Circuits (ICs) 304 each corresponding to usage of one of the ECUs 300, and a communication device 305 such as a CAN transceiver. The microcomputer 301 includes an SRAM 302 (volatile memory) and a FLASH memory 303 (nonvolatile memory) therein.

The configuration of the program writing device 310 is basically the same as that of the ECU 300, but the program writing device 310 further includes a communication device corresponding to the protocol of a network outside the vehicle. That is, the program writing device 310 includes a microcomputer 311, various ICs 314, a communication device 315 such as a CAN transceiver, and a communication device 316 corresponding to a protocol of a network outside the vehicle. The microcomputer 311 includes an SRAM 312 and a FLASH memory 313 therein.

Figure 4:
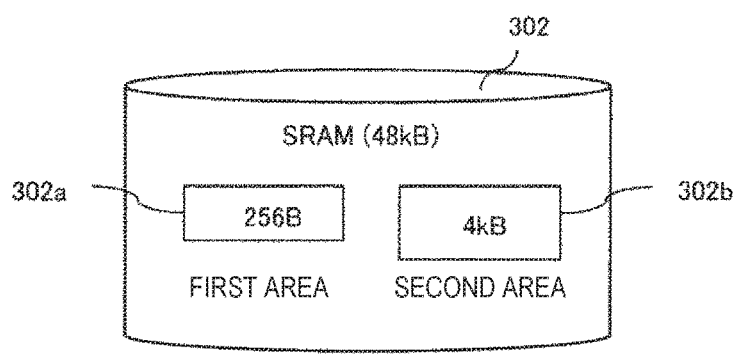
FIG. 4 is a schematic diagram illustrating the internal configuration of an SRAM of an ECU illustrated in FIG. 3.

Next, the configuration of the SRAM 302 of the ECU 300 will be described with reference to FIG. 4. FIG. 4 is a schematic diagram illustrating the internal configuration of the SRAM 302 illustrated in FIG. 3.

The SRAM 302 includes a first area 302a for temporarily storing data and a second area 302b for restoring the data stored in the first area 302a.

In the present embodiment, as an example, the size of the SRAM 302 is 48 kB, the size of the first area 302a is 256 B, and the size of the second area 302b is 4 kB.

Figure 5:
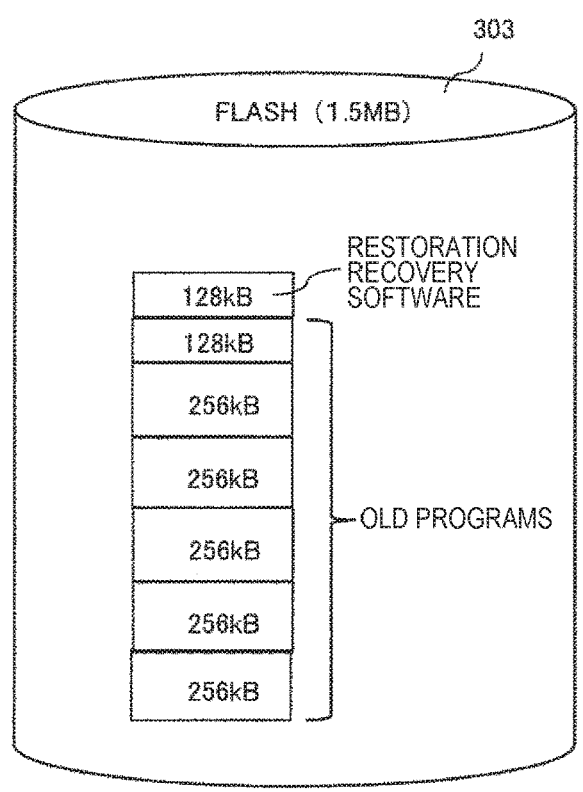
FIG. 5 is a schematic diagram illustrating the internal configuration of a FLASH memory of the ECU illustrated in FIG. 3.

Next, the configuration of the FLASH memory 303 will be described with reference to FIG. 5. FIG. 5 is a schematic diagram illustrating the internal configuration of the FLASH memory 303 illustrated in FIG. 3.

The FLASH memory 303 is composed of blocks of a plurality of sizes. In the present embodiment, as an example, the size of the FLASH memory 303 is 1.5 MB. The FLASH memory 303 is composed of two types of blocks of 128 kB and 256 kB. Here, a block is a minimum unit for erasing data. For example, when data of 4 kB is written to a block of 128 kB, data of 4 kB is written after erasing data of 128 kB.

As illustrated in FIG. 5, in the FLASH memory 303, restoration recovery software is arranged in a top block of 128 kB. The restoration recovery software is composed of communication software for communicating with the program writing device 310, restoration control software for identifying received data to be differential data, compressed data, or all update data and activating restoration software, and the restoration software. In the following blocks of 128 kB, 256 kB, 256 kB, 256 kB, 256 kB, and 256 kB, old programs are stored.

The communication software temporarily stores the received data received from the program writing device 310 in the first area 302a of the SRAM 302. If the type of the data is differential data, the restoration control software activates the restoration software and restores a new program in the second area 302b of the SRAM 302 from the data in the first area 302a and an old program already existing in the FLASH memory 303. If the type of the data is compressed data, the restoration control software decompresses the compressed data in the first area 302a and restores a new program in the second area 302b of the SRAM 302. The restoration control software also performs writing processing to the temporary block after the restoration. Detailed description of the restoration processing of the in-vehicle control device will be described in detail below using the drawings.

Next, a basic concept of generation of differential data and generation of compressed data of a block to be updated performed by the PC 1 of the program generating device 100 will be described with reference to FIG. 6.

Figure 6:
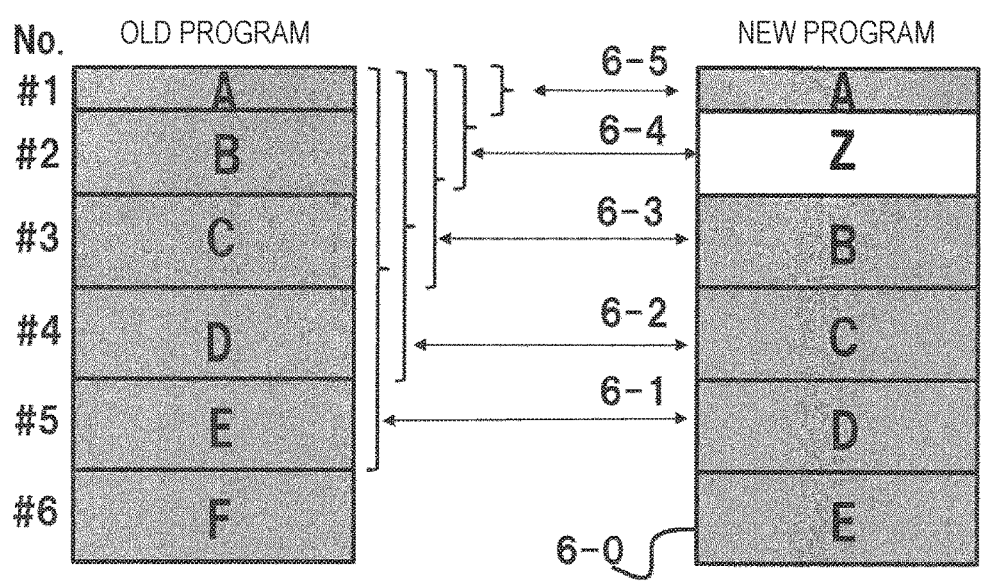
FIG. 6 is an explanatory diagram of a basic concept of generation of differential data and generation of compressed data by encoding control software illustrated in FIG. 7.

First, FIG. 6 is a diagram in which each of an old program and a new program is arranged in block #1 to block #6 of the flash memory. Block #1 is a block having an upper address, and block #6 is a block having a lower address. As the old program, a program A is arranged in block #1, a program B is arranged in block #2, a program C is arranged in block #3, a program D is arranged in block #4, a program E is arranged in block #5, and a program F is arranged in block #6. On the other hand, in the new program, a program Z is added to block #2. Therefore, the program A is arranged in block #1, the program Z is arranged in block #2, the program B is arranged in block #3, the program C is arranged in block #4, the program D is arranged in block #5, and the program E is arranged in block #6. Thus, in the new program, the programs B to E are shifted to blocks of lower addresses by one due to the addition of the program Z. Here, the temporary block is considered as last block #6 indicated by 6-0.

First, a block to be updated is selected in the order from a block of a lower address to a block of an upper address. Block #5 indicated by 6-1 is set as the first block to be updated. In the old program, a plurality of blocks including the block to be updated and blocks having upper addresses are selected. As a result, in the old program, the programs E, D, C, B, and A of blocks #1 to #5 are selected. Differential data for block #5 is generated with the new program D of block #5 and the old programs E, D, C, B, and A of blocks #1 to #5 as input. Obviously, the new program D is similar to the old program D. Thus, encoding software for generating the differential data can convert the old program D into the above-mentioned copy command by making similar sub-strings. By encoding in this manner, differential data of a small size can be generated. It is obvious that if the differential data were generated between the same blocks, the new program would not be so similar to the old program E as to the old program D.

Next, the block #4 indicated by 6-2 is selected as a block to be updated. For the new program C, the old programs D, C, B, and A are used. Likewise, the program C is included in the old programs. Thus, the differential data can be converted to a copy command by making similar sub-strings from the program C. Through such encoding, small differential data can be generated. Next, the block #3 indicated by 6-3 is selected as a block to be updated. For the new program B, the old programs C, B, and A are used. Likewise, the program B is included in the old programs. Thus, small differential data can be generated. Next, the block #2 indicated by 6-4 is selected as a block to be updated. For the new program Z, the old programs C, B, and A are used. Unfortunately, the similarity of the added program Z to the old programs is unknown. Differential data cannot be necessarily made small. Next, the block #1 indicated by 6-5 is selected as a block to be updated. For the new program A, the old program A is also used. Differential data can be made small.

Finally, the temporary block 6-0 is selected as a block to be updated #6. As described above, the old program in the temporary block has been rewritten. Thus, differential update is not possible. Therefore, the new program E is compressed to generate compressed data.

The basic concept of differential data generation and compressed data generation of a block to be updated has been described in detail. Here, as the old programs indicated by 6-1, 6-2, 6-3, 6-4, and 6-5, programs arranged in the block to be updated and a plurality of blocks of its upper addresses are selected. The reason is that a block of a lower address is prioritized to be a block to be updated, and thus blocks lower than the block to be updated already have new programs and do not have old programs. This is a result of emphasizing the concept that the differential data is generated from the new program and the old program.

Of course, for a new program of a block to be updated, combination of an old program and a new program may be selected as old programs. For example, when the block #4 is selected as a block to be updated, differential data for the new program C may be generated using the new program D in the block #5 and the old programs D, C, B, and A of the blocks #1 to #4. In this way, a wider range of programs can be searched for a similar sub-string, and thus there is a possibility that the size of the differential data can be further decreased. However, the encoding software for generating differential data has to generate differential data by mixing old programs and new programs, which may complicate the processing.

An embodiment will be described based on the basic concept of generating differential data and compressed data of a block to be updated described above.

Figure 7:
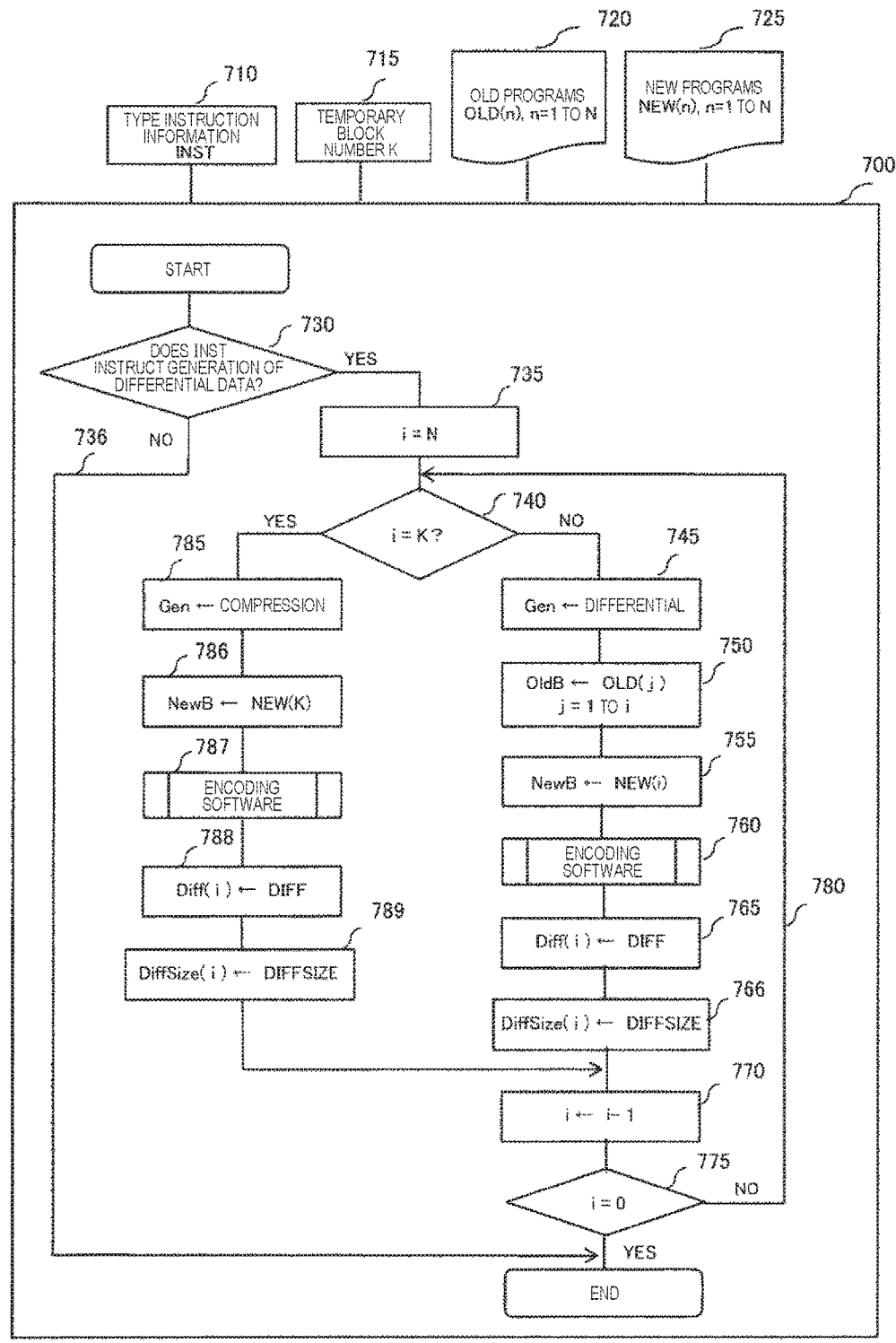
FIG. 7 is a flowchart of the encoding control software for controlling encoding software illustrated in FIG. 8.
Figure 8:
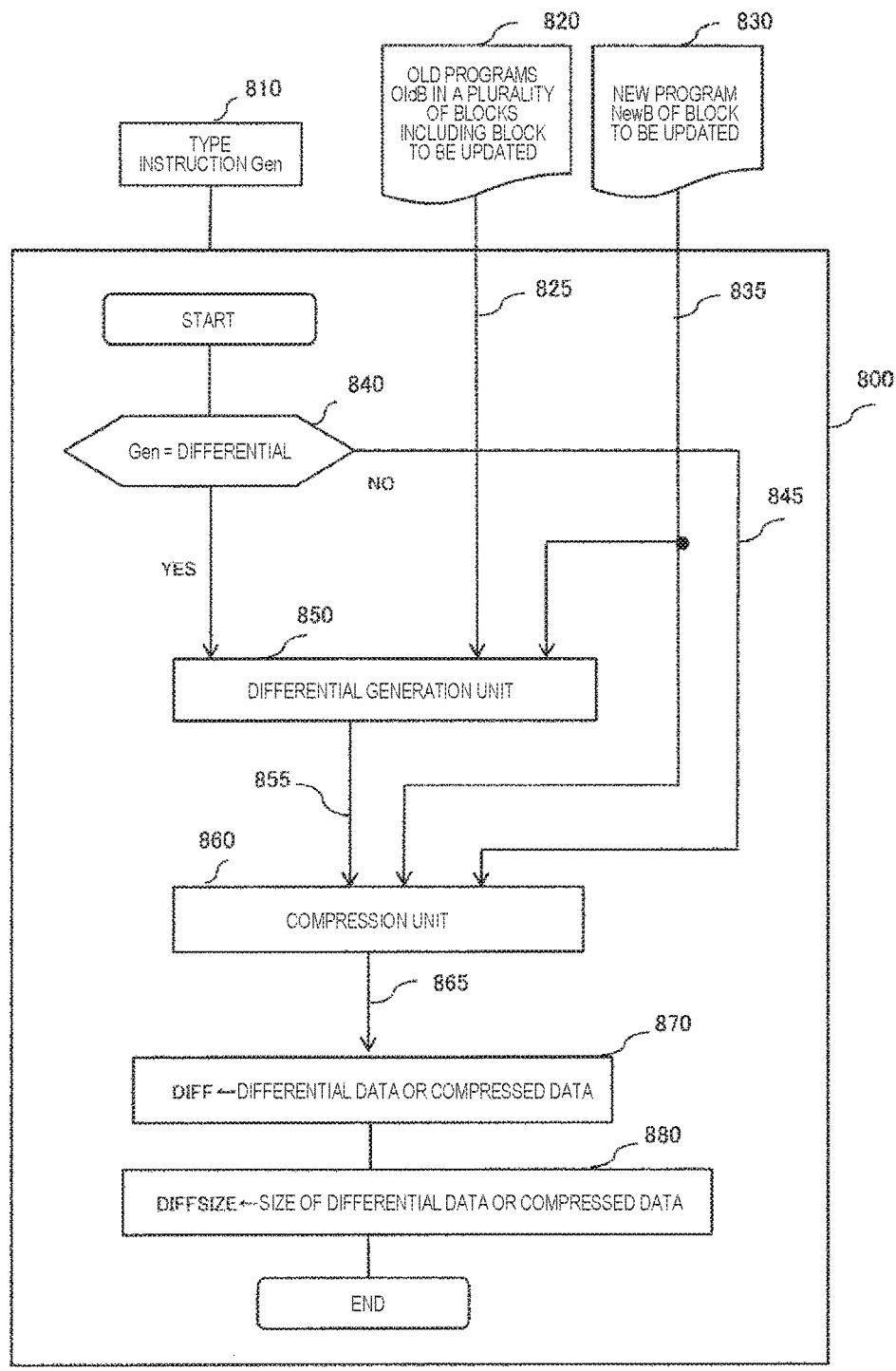
FIG. 8 is a flowchart of the encoding software for generating differential data or compressed data of a block to be updated.
Figure 9:
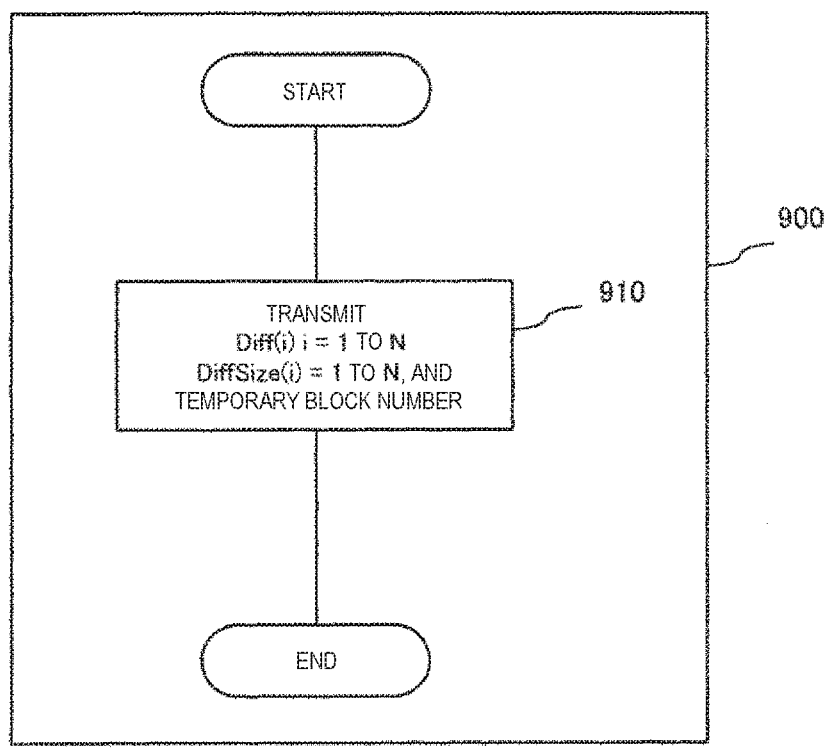
FIG. 9 is a flowchart of communication software of the PC illustrated in FIG. 1.
Figure 10:
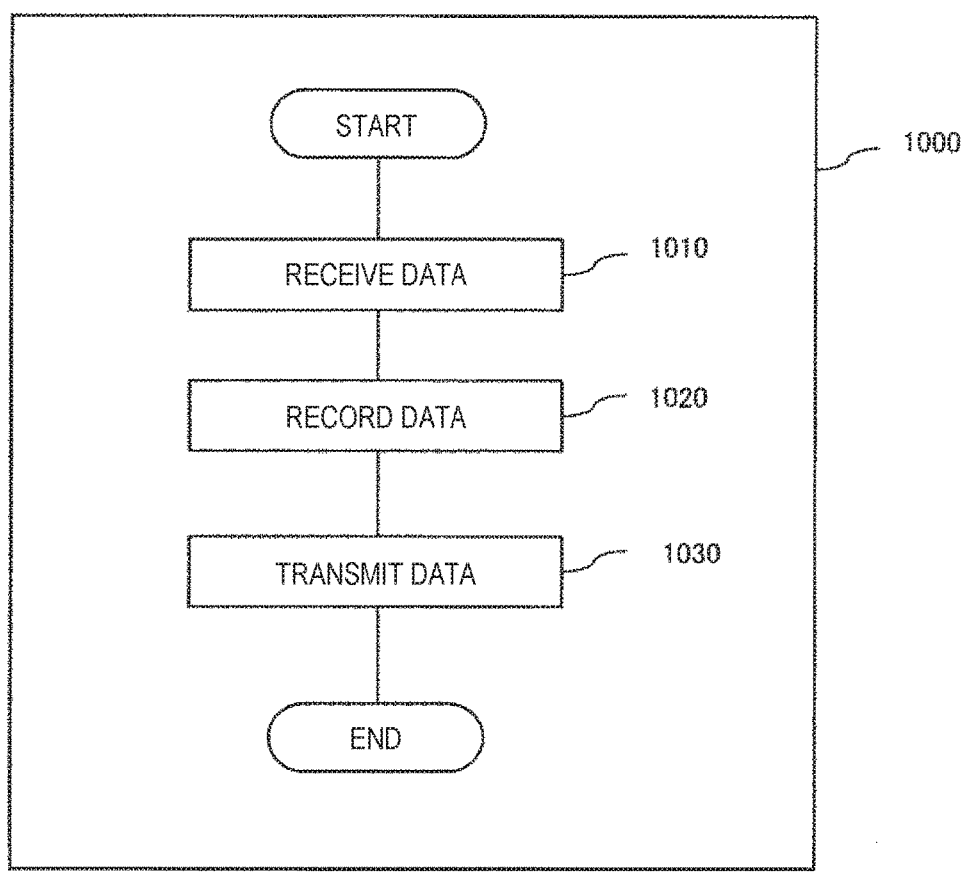
Figure 13:
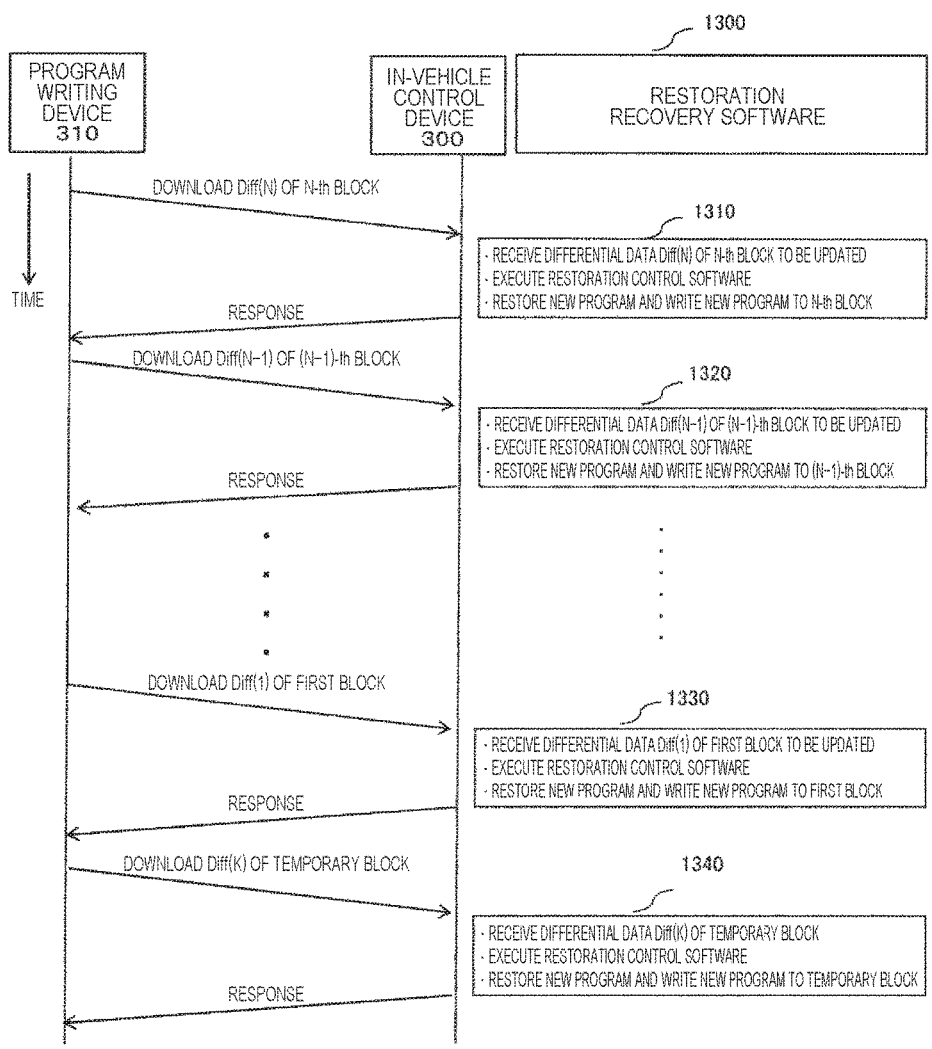
FIG. 13 is a flowchart of restoration recovery software arranged in a flash memory of the in-vehicle control device illustrated in FIG. 5.
Figure 14:
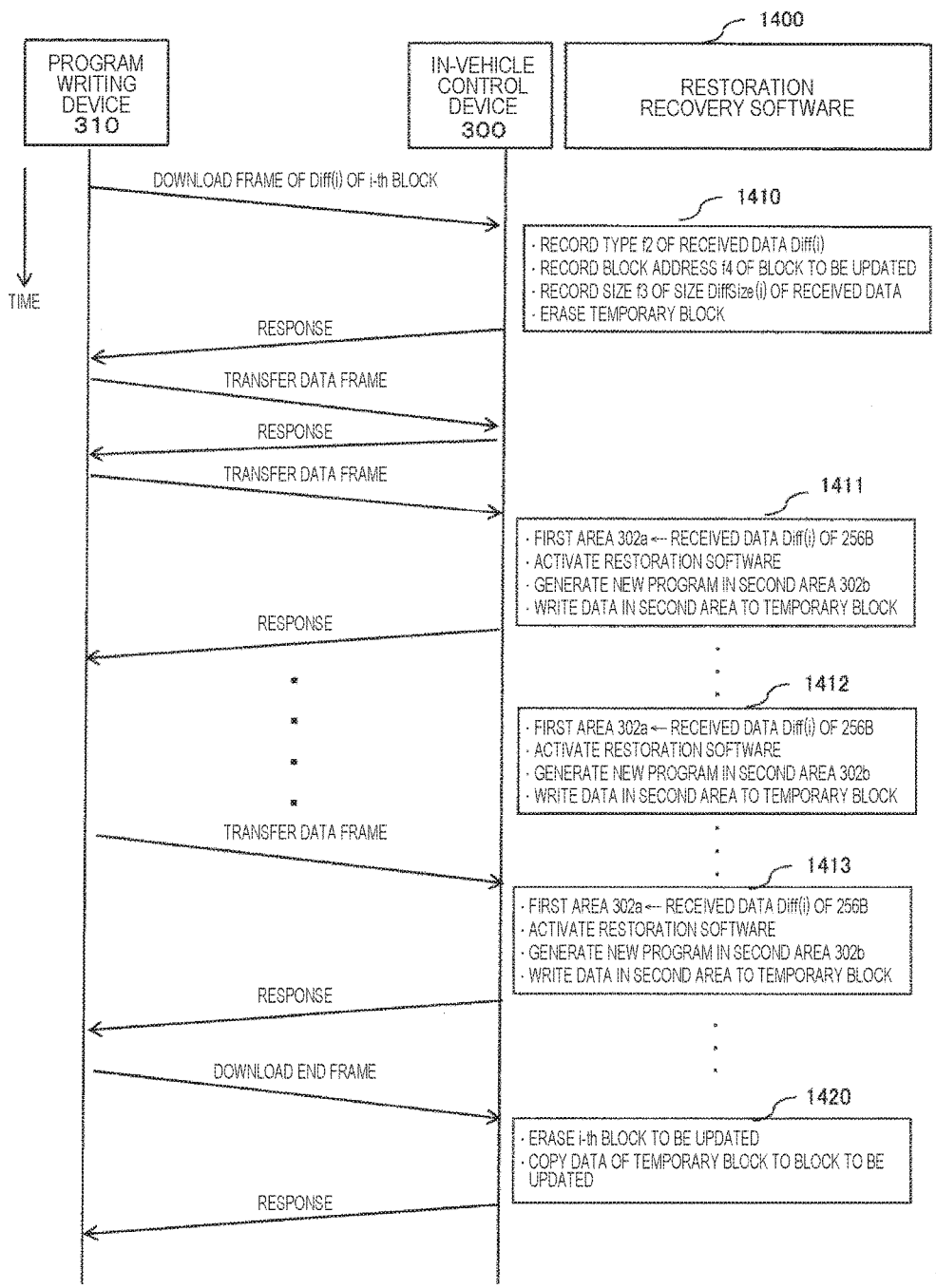
FIG. 14 is a flowchart of restoration control software activated from the restoration recovery software illustrated in FIG. 13.
Figure 15:
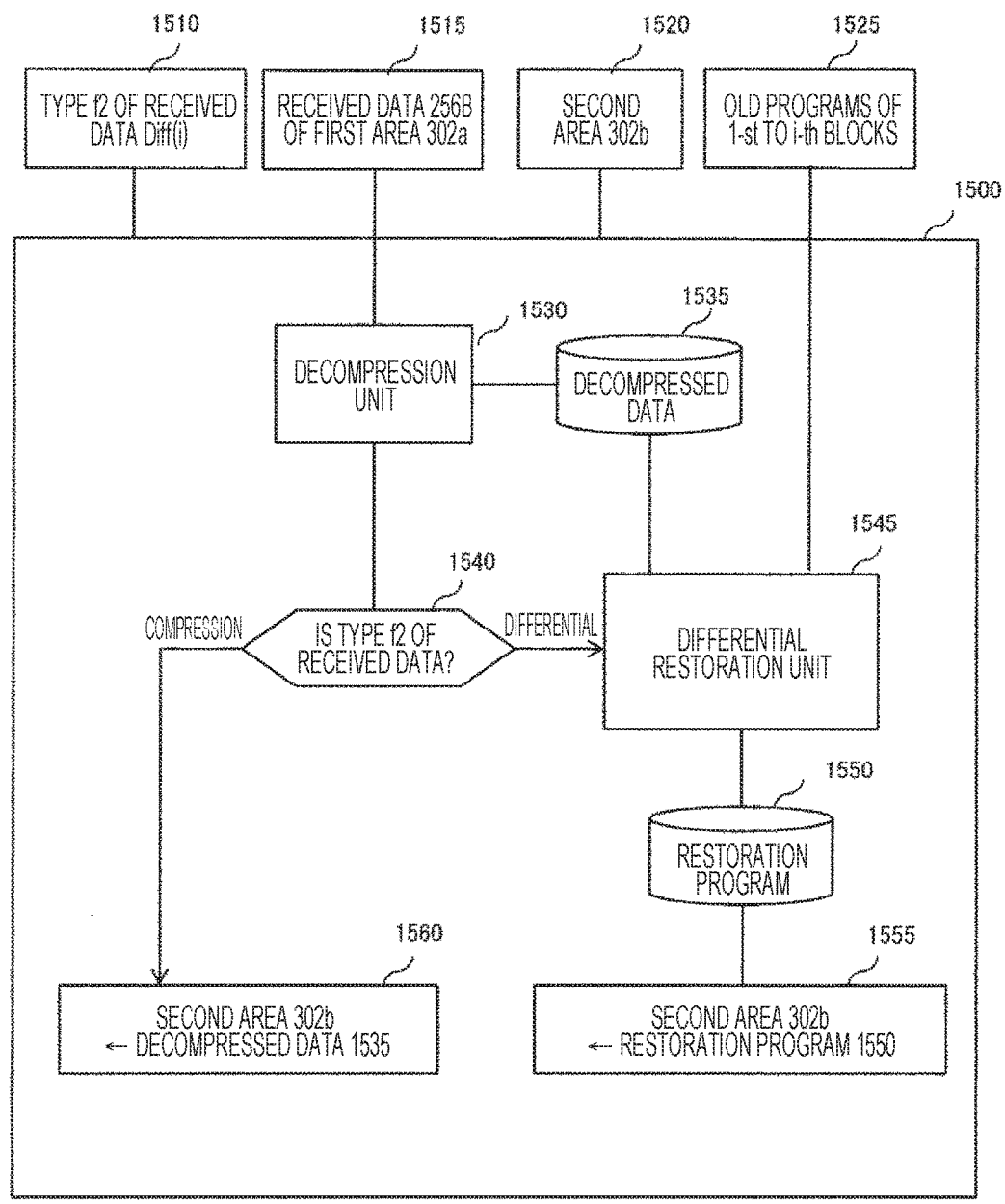
FIG. 15 is a flowchart of restoration software activated from the restoration control software illustrated in FIG. 14.
Figure 16A:
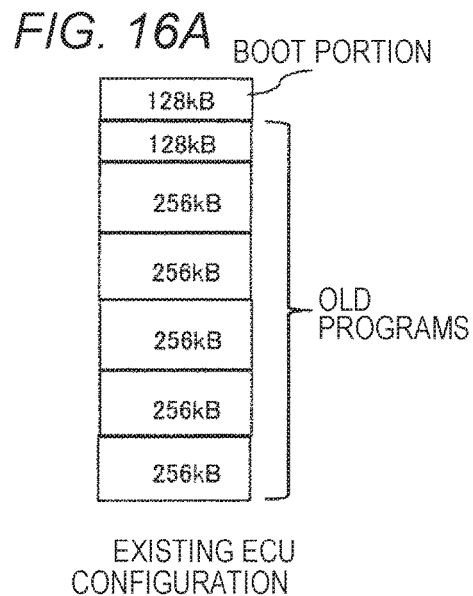
FIGS. 16A to 16D illustrate a conceptual diagram of differential update of an existing ECU using the restoration recovery software.
Figure 16B:
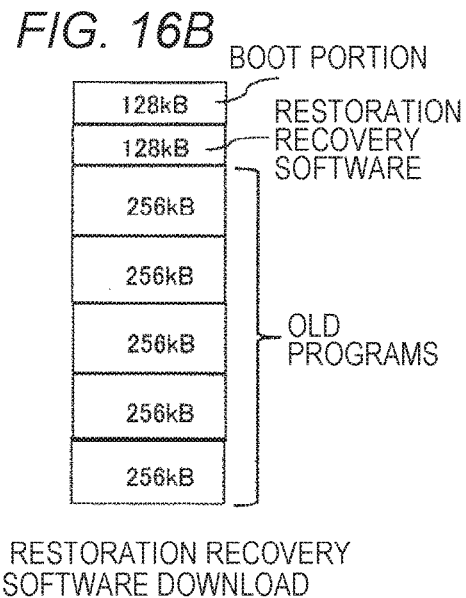
Figure 16C:
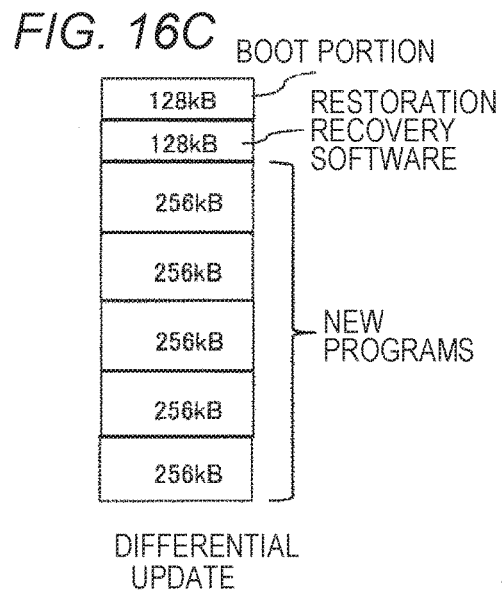
Figure 16D:
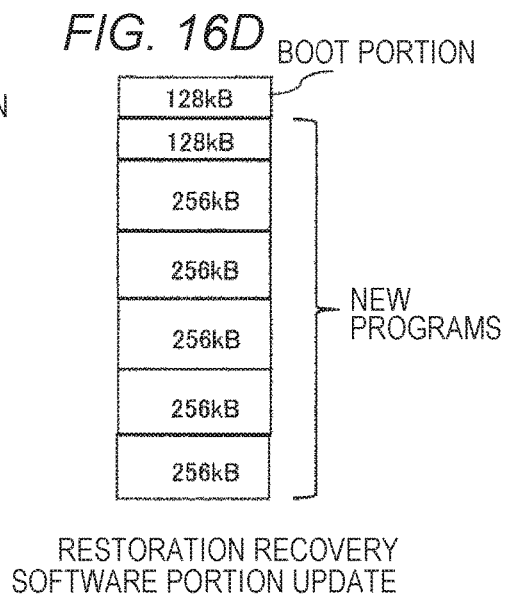

FIG. 7 is a flowchart of encoding control software executed on the PC 1 of the program generating device 100. FIG. 8 is a flowchart of encoding software called from the encoding control software to generate differential data or compressed data of a block to be updated. FIG. 9 is a flowchart of communication software for transmitting data from the PC 1 to the server 2. FIG. 10 is a flowchart of communication software of the server 2 that receives data from the PC 1 and transmits data to the program writing device 310. FIG. 11 is a flowchart of communication software for receiving data from the server 2 and transmitting data to the program writing device 310. FIG. is a configuration diagram of communication frames between the program writing device 310 and an in-vehicle control device 300. Three types of commands are defined. FIG. 13 is a flowchart illustrating the operation of the restoration recovery software of the in-vehicle control device 300. The restoration recovery software is composed of the communication software, the restoration control software, and the restoration software. FIG. 14 is a flowchart illustrating the operation of the restoration control software. FIG. 15 is a flowchart of the restoration software.

Embodiments will be described in detail with reference to the drawings.

FIG. 7 is a flowchart of the encoding control software 700 executed on the PC 1. The input is old programs OLD (n), n=1 to N720 obtained by dividing the old program such that the obtained old programs each have a size of a corresponding block of the microcomputer, new programs NEW (n), n=1 to N725, a block number K715 which can uniquely identify a temporary block, and type instruction information INST 710 for instructing generation of differential data. In the present embodiment, the type instruction information INST 710 is only an instruction for generating differential data, but the embodiment can be expanded to allow an instruction for generating compressed data for all the blocks. The processing includes selecting a block to be updated, instructing the encoding software to take a differential or to compress, and activating the encoding software for each block to be updated to generate differential data or compressed data.

The encoding control software 700 first determines whether INST instructs generation of differential data in 730. This INST is a parameter instructed by a user of the encoding control software 700. If YES, an initial value N is set to a variable i in 735 after 730. The variable i is the block number to be updated. N is the last block number. Next, in 740, it is checked whether the variable i is the temporary block number K. If NO, in 745, DIFFERENTIAL is set to a variable Gen, in 750, old programs in the block to be updated and a plurality of blocks OLD (j), j=1, . . . , i are set to a variable OldB, and in 755, a new program NEW (i) of the block to be updated i is set to a variable NewB. In 760, the encoding software is then activated.

As illustrated in FIG. 8, the encoding software generates differential data by using the type instruction Gen, the old program OldB, and the new program NesB as input, stores the differential data in a variable DIFF, and stores the size of the differential data in a variable DIFFSIZE. Detailed description will be provided below with reference to FIG. 8. What is important here is that as old programs used for the processing of the new program of the block to be updated i, old programs in a plurality of blocks 1 to (i−1) in addition to the block to be updated i are input to the encoding software.

Next, when the execution of the encoding software is completed, the differential data DIFF is stored in a variable Diff (i) in 765, and the size of the differential data DIFFSIZE is stored in a variable DiffSize (i) in 766. In this manner, the differential data of the block to be updated i is stored in Diff (i), and the size of the differential data is stored in DiffSize (i). Next, in step 770, the variable i is decremented and a next block to be updated is selected. In 775, if i=0, the encoding of all blocks to be updated is completed, and if i is not 0, the encoding is not completed, and thus 740 is repeated again through 780. In 740, it is checked whether the block to be updated i is the temporary block K. If YES, compressed data generation instruction is set to the variable Gen in 785. In 786, the new program New (K) of the temporary block K is stored in the variable NewB, and in 787, the encoding software is activated.

As illustrated in FIG. 8, the encoding software generates compressed data by using the type instruction Gen and the new program NesB as input. The compressed data is stored in the variable DIFF, and the size of the compressed data is stored in the variable DIFFSIZE. Detailed description will be provided below with reference to FIG. 8. When the execution of the encoding software is completed, the compressed data DIFF is stored in the variable Diff (i) in 788, and the size of the compressed data DIFFSIZE is stored in the variable DiffSize (i) in 789. In this manner, the differential data of the block to be updated i is stored in Diff (i), and the size of the differential data is stored in DiffSize (i). As described above, the differential data or the compressed data is stored in the variable Diff (i), i=1 to N, and the size of the differential data or the compressed data is stored in the variable DiffSize (i), i=1 to N. It can be understood that the differential data is the compressed data in the case of i=K.

Next, a flowchart of the encoding software 800 will be described with reference to FIG. 8.

The input is a type instruction Gen 810, old programs OldB 820 in a plurality of blocks including the block to be updated, and a new program 830 of the block to be updated. The encoding software 800 first determines whether the type instruction Gen is DIFFERENTIAL in 840. If YES, the differential data is generated in the following steps. In 850, a differential generating unit searches for similar sub-strings between the new program and the old programs using OldB 820 and NewB 830 that are input, and encodes a sub-string of the new program into a copy command. By encoding the sub-string similar to the old program along with the address and the size thereof, the copy command can be decoded. If a sub-string similar to a sub-string of a new program does not exist in the old program, the sub-string of the new program is added to an add command and the add command is encoded.

In this manner, the differential generation unit 850 encodes using the copy command and the add command, but the differential generating unit 850 may encodes by using other differential generating methods. For example, if a sub-string similar to a sub-string of a new program exists in the old program, a subtraction sub-string may be generated by subtracting the sub-string of the old program from the sub-string of the new program, and a pair of the subtraction sub-string and a subtraction command may be encoded to be encoded data.

If the sub-string of the new program is not similar to any sub-string of any old program, the sub-string of the new program and a new command may be paired and encoded to be encoded data. The encoded data obtained by encoding as described above is input to a compression unit 860 through 855. The compression unit 860 encodes the encoded data into differential data having even smaller size, and stores the differential data in the variable DIFF in 870. Here, the compression unit 860 may use any compression algorithm as long as the algorithm is a reversible. For example, ZIP or a dictionary-type algorithm using a sliding window such as LZ77 may be used. Compression algorithms can efficiently compress sub-strings in which digits of the same value are consecutive. Thus, the above-described subtraction sub-string can be made very small. As a result, the size of differential data can be decreased. Finally, the size of the differential data is stored in the variable DIFFSIZE in 880, and the processing ends.

On the other hand, if NO in 840, the compression unit 860 is executed through 845. The new program NewB is input through 835 and compressed, so that compressed data is generated. Next, through 865, the compressed data is stored in the variable DIFF in 870. Next, in 880, the size of the compressed data is stored in the variable DIFFSIZE and the processing ends.

FIG. 9 is a flowchart in which the PC 1 transmits differential data to the server 2. Communication software 900 transmits the differential data Diff (i), 1 to N generated by the PC 1 in 910, the size of the differential data DiffSize (i), 1 to N, and the temporary block number.

FIG. 10 is a flowchart of communication software 1000 that makes the server 2 receive the differential data from the PC 1 and transmit the data to the program writing device 310.

In 1010, the server 2 receives the differential data from the PC 1, records the data in 1020, and transmits the differential data to the program writing device 310 in 1030.

FIG. 11 is a flowchart of communication software 1100 that makes the program writing device 310 receive the differential data from the server 2, and transmit the differential data to the in-vehicle control device 300 through an in-vehicle network. In 1110, the program writing device 310 receives the differential data the server 2, and records the data in 1120. Next, in 1130, the program writing device 310 determines whether software update is possible depending on the state of the vehicle. That is, the program writing device 310 determines whether the vehicle is in a stop state to consume a little lead battery, and the lead battery has sufficient storage capacity. If YES, the program writing device 310 generates a frame in 1140, and transmits the differential data to the in-vehicle control device 300 in 1150. If NO in 1130, the program writing device 310 waits until the vehicle is ready for software update.

Here, transmission of differential data in 1150 will be described in detail with reference to FIG. 12.

FIG. 12 illustrates the types of frames when the differential data is transmitted to the in-vehicle control device 300. There are three types of frames illustrated in FIG. 12.

A frame (a) is a frame for informing the in-vehicle control device 300 of the information of the block to be updated. A command f1 is a download command and a type f2 indicates which of differential data, compressed data, or a new program itself the data being transmitted is. A size f3 indicates the size of the data being transmitted. The size is the size of data of the type f2. A block address f4 indicates the head address of the block to be updated.

Next, a frame (b) is a frame for transmitting data to the in-vehicle control device 300. A command f1 is a transfer data command, and a counter f5 is a counter indicating the number of transmissions of a transfer data frame. The count is incremented for each transmission. Block data f6 is data being transmitted. The transfer data frame is a frame used for transmitting data having a size specified by the size f3 of the download frame. However, it is not possible to successively transmit data larger than the size of a reception buffer of the in-vehicle control device 300. For this reason, after data having a certain size is divided for a plurality of transmissions and transmitted successively, the program writing device 310 has to wait for a response from the in-vehicle control device 300 to transmit next data having a certain size. Here, since the size of the first area 302a, which is the reception buffer, is 256 B, the data is divided into 6-byte parts and the data of 256 B is transmitted. Furthermore, by repeating the transmission of 256 B data, data having the size f3 is transmitted.

Finally, a frame (c) is a download end command. The command f1 indicates the end of downloading. That is, when the transmission of the data having the size f3 of the download command is completed, the frame (c) is transmitted to the in-vehicle control device 300.

The frames between the program writing device 310 and the in-vehicle control device 300 have been described. Before describing the details of communication, the overall operation of the restoration recovery software of the in-vehicle control device 300 will be described with reference to FIG. 13.

The differential data of the blocks to be updated is transmitted to the in-vehicle control device 300 in the order from the differential data Diff (N) of the N-th block to the differential data Diff (1) of the 1-st block. First, the differential data Diff (N) of the N-th block to be updated is transmitted from the program writing device 310 to the in-vehicle control device 300.

Upon receiving the differential data Diff (N), the restoration recovery software 1300 of the in-vehicle control device 300 executes the restoration control software in 1310 and writes the new program restored by the restoration software to the N-th block. When writing is completed, the restoration recovery software 1300 returns a response to the program writing device 310. Similarly, differential data Diff (N−1) of the (N−1)-th block to be updated is transmitted to the in-vehicle control device 300.

Upon receiving the differential data Diff (N−1), the restoration recovery software 1300 of the in-vehicle control device 300 executes the restoration control software in 1320 and writes the new program restored by the restoration software to the (N−1)-th block. When writing is completed, the restoration recovery software 1300 returns a response to the program writing device 310. Similarly, differential data Diff (1) of the 1-st block to be updated is transmitted to the in-vehicle control device 300.

Upon receiving the differential data Diff (1), the restoration recovery software 1300 of the in-vehicle control device 300 executes the restoration control software in 1330 and writes the new program restored by the restoration software to the 1-st block. When writing is completed, the restoration recovery software 1300 returns a response to the program writing device 310. Finally, the compressed data Diff (K) of the temporary block is transmitted to the in-vehicle control device 300.

Upon receiving the compressed data Diff (K), the restoration recovery software 1300 of the in-vehicle control device 300 executes the restoration control software in 1330 and writes the new program restored by the restoration software to the K-th block, which is the temporary block. When writing is completed, the restoration recovery software 1300 returns a response to the program writing device 310. The above-described operation of the restoration recovery software 1300 can update the new program.

FIG. 14 is a flowchart of the restoration control software 1400. A detailed operation for one block to be updated will be described.

First, the type f2 of the data Diff (i) of the i-th block, the block address f4 of the block to be updated, and the data size f3 are transmitted from the program writing device 310 to the in-vehicle control device 300 in a download frame. Here, the type f2 of the download frame is COMPRESSION if the block is the temporary block, and is DIFFERENTIAL if the block is another block. The size f3 is the size of data DiffSize (i). The block address f4 is the head address of the i-th block.

The restoration control software 1400 of the in-vehicle control device 300 records the type f1 of the download frame in 1410. The restoration control software 1400 also records the block address f4 indicating the head address of the block to be updated and the size of the data f3. Next, the restoration control software 1400 erases the predetermined temporary block. The restoration control software 1400 returns a response to the program writing device 310 after the erasing is completed. Next, the program writing device 310 transmits a transfer data frame. First, the counter f5 is incremented and set, and data of Diff (i) having 256 Byte is set in the block data f6, and divided transmission is performed.

Upon receiving data of 256 B in first area 302*a* in 1411, the restoration control software 1400 of the in-vehicle control device 300 inputs the already recorded type f1 to the restoration software and activates the restoration software. The restoration software generates a new program in the second area 302*b* depending on the type f1. The restoration control software 1400 writes the generated new program to the temporary block. When writing is completed, the restoration control software 1400 returns a response to the program writing device 310. The restoration control software 1400 repeats the processing of restoring the new program and writing the new program to the temporary block in 1412 and 1413 every time when the restoration control software 1400 receives 256 B in the transfer data frame. When transmission of the differential data or the compressed data of the block to be updated is completed, the program writing device 310 transmits a download end frame.

Upon receiving the download end frame, the in-vehicle control device 300 identifies the block to be updated from the block address f4 of the block to be updated that has already been recorded and erases the block to be updated. Next, the in-vehicle control device 300 copies the new program in the temporary block to the block to be updated. After the copy is completed, the in-vehicle control device 300 returns a response to the program writing device 310 and the processing ends. As described above, writing of the new program to the block to be updated is completed.

Referring now to FIG. 15, a flowchart of the restoration software 1500 will be described.

The input is the type f2 of received data 1510, the received data 256 B in the first area 302*a* 1515, the second area 302*b* 1520, and old programs in the first to the i-th blocks 1525 of the flash memory. The old programs in the 1-st to i-th blocks 1525 indicate the range of the old programs illustrated in FIG. 6.

The restoration software 1500 is roughly composed of two units: a decompression unit 1530 and a differential restoration unit 1545. The received data 256 B as the input 1515 is compressed data or differential data. However, since both are compressed, first, the received data is decompressed by the decompression unit 1530. As a result, decompressed data 1535 is generated. Here, the decompression software of the decompression unit is software paired with the compression unit 860 of FIG. 8. However, the compression unit 860 and decompression unit 1530 are not limited as long as they are reversible compression and decompression software. For example, ZIP or sliding dictionary type LZ77 may be used.

Next, in 1540, it is determined whether the type f2 of the received data is DIFFERENTIAL or COMPRESSION. If the type is DIFFERENTIAL, the differential restoration unit 1545 restores a restored program 1550 using the decompressed data 1535 and the old programs in the 1-st to i-th block 1525. Describing in detail, it is assumed that the decompressed data 1535 is composed of a copy command, an add command, and a new sub-string. For a copy command, the differential restoration unit 1545 copies from the old programs 1525 to generate a restoration program 1550. On the other hand, for an add command, the differential restoration unit 1545 generates a restoration program 1550 using the new sub-string. A new program can be restored by repeating these operations.

A case where the decompressed data 1535 is composed of a pair of a subtraction command and a subtraction sub-string or a pair of a sub-string of a new program and a new command is assumed. The subtraction command is a differential between a sub-string of a new program and a similar sub-string of an old program. Therefore, the differential restoration unit 1545 adds the subtraction sub-string and the specified sub-string of the old programs 1525 to generate the restoring program 1550.

For a new command, a sub-string which is a counterpart of the new command is generated into the restoration program 1550. In this way, the differential restoration unit 1545 can restore a new program and generate a restoration program 1550. Next, the restoration program 1550 is stored in the second area 302*a*.

Next, the processing in the case where the type f2 is COMPRESSION in 1540 will be described. If the type f2 is COMPRESSION, the decompressed data 1535 is the new program itself. Therefore, the decompressed data 1560 is stored in the second area 302*b* in 1560 and the processing ends.

In this way, since the restoration software 1500 can identify whether the data type is compression or differential according to the type f2 and restore the new program, the restoration software 1500 can restore the new program from the differential data 1310 to 1330, and from the compressed data 1340 in FIG. 13.

There has been described an embodiment of an in-vehicle control device using a microcomputer with a built-in flash memory using a small amount of RAM and composed of large blocks, in which, restoration processing of differential reprogramming is possible, and restoration of a new program in a short time is possible by decreasing the size of differential data even for a new program to which major changes have been made.

Next, an embodiment, in which reprogramming of an already shipped in-vehicle control device can be completed in a short time by using the restoration recovery software described in detail in the present embodiment will be described.

First, the already shipped in-vehicle control device is an ECU having a flash memory configuration of Existing ECU Configuration (a) in FIG. 16. That is, the flash memory is composed of a boot portion and old programs, differential update software is not implemented in the boot portion, and full-text data update software is implemented. An object of the present invention is to provide means for achieving high-speed update of such an existing ECU by differential update.

In order to realize the differential data update, it is obviously necessary to download restoration recovery software for restoring the differential data to the in-vehicle control device and execute the software. The concept and procedure will be described with reference to FIG. 16.

As already described, the Existing ECU Configuration (a) is composed of a boot portion and old programs, and initialization processing and conventional full-text data update software are implemented in the boot portion. The ECU performs control for executing full-text data update software in the boot portion if an abnormality occurs in initialization processing, and for executing the application if no abnormality occurs.

The Restoration Recovery Software Download (b) illustrates a state where restoration recovery software is downloaded from the program writing device and written in a block of 128 kB of the flash memory. In this way, restoration recovery software is downloaded to a predetermined block.

Next, Differential Update (c) illustrates a state where the restoration recovery software is activated and all other blocks are written to new programs by differential update in the procedure already described in the embodiment.

Finally, Restoration Recovery Software Portion Update (d) illustrates a state where the restoration recovery software in the remaining block of 128 kB is rewritten to a new program. By combining the full-text data update and the differential update using differential data in such a procedure, the reprogramming time is shortened.

Figure 17:
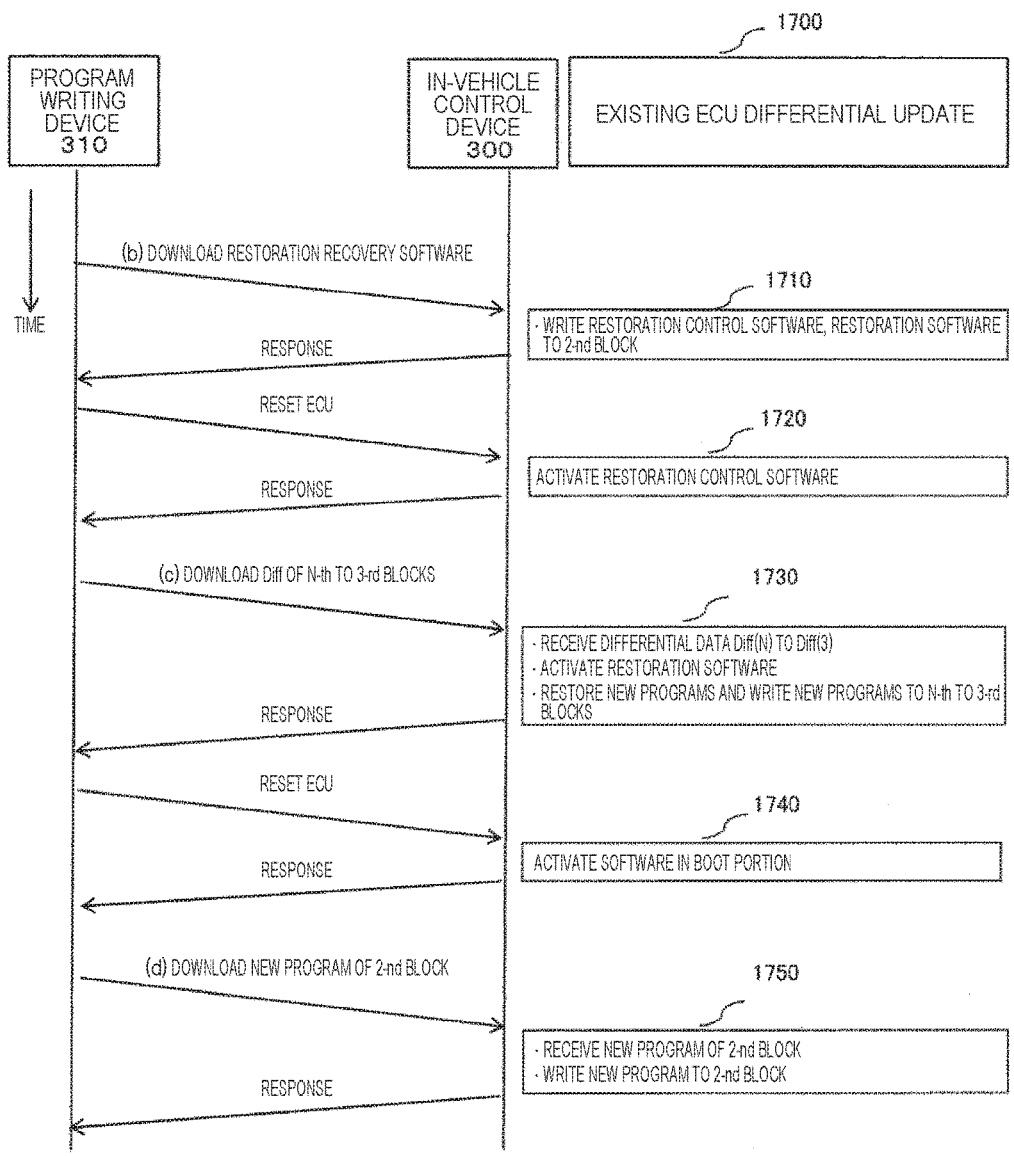
FIG. 17 is a flowchart illustrating a procedure of differential update of the existing ECU using the restoration recovery software.

A detailed operation for realizing such a procedure will be described with reference to FIG. 17. Reference numeral 1700 denotes a procedure of existing ECU differential update. In the present embodiment, restoration recovery software is written in the 2-nd block.

From the program writing device 310 to the in-vehicle control device 300, the restoration recovery software is downloaded in the 2-nd block (b). This download is realized by the full-text data update software in the boot portion. The in-vehicle control device 300 writes the restoration recovery software (restoration control software, restoration software) received in 1710 into the 2-nd block. When writing is completed, the restoration recovery software 1300 returns a response to the program writing device 310.

Next, the program writing device 310 requests ECU reset to the in-vehicle control device 300. In 1720, the in-vehicle control device resets the ECU, and starts initialization processing of the boot portion. If no abnormality occurs, the in-vehicle control device activates the restoration control software in the 2-nd block and returns a response.

Next, the program writing device 310 transmits the encoded data (differential data or compressed data) in the N-th to the 3-rd blocks to the in-vehicle control device 300 (c), and the in-vehicle control device 300 executes the restoration control software and the restoration software to restore a new program using the differential data or the compressed data every time when the in-vehicle control device 300 receives the encoded data of one of Diff (N) to Diff (3), writes the new program to the corresponding one of the N-th to 3-rd blocks in 1730, and returns a response with an abnormality diagnosis code set.

Next, the program writing device 310 requests ECU reset. The in-vehicle control device resets the ECU in 1740 to perform initialization processing of the boot portion, activates full-text data update software in the boot portion due to abnormality diagnosis, and returns a response.

Next, the program writing device 310 downloads a new program in the 2-nd block (d). The in-vehicle control device 300 receives the new program in the 2-nd and writes the new program to the 2-nd in 1750.

As described above, the old program has been rewritten to a new program.

In the present embodiment, the ECU is controlled such that the restoration control software is activated as an application after resetting the ECU or the control for activating the full-text data update software in the boot portion is performed by setting the abnormality diagnosis code. However, such control is possible by setting a mode. That is, it is possible to activate the full-text data update software in the boot portion in a repro mode, and to activate the restoration control software in a normal mode. Such switch can be performed in any way.

Thus, it can be seen that the updating procedure of the existing ECU in the present embodiment is composed of three phases. The first phase is the download of the restoration recovery software by full-text data update. The second phase is the differential update by executing the restoration recovery software. The third phase is the writing of a new program to the restoration recovery software portion by full-text data update.

Figure 18:
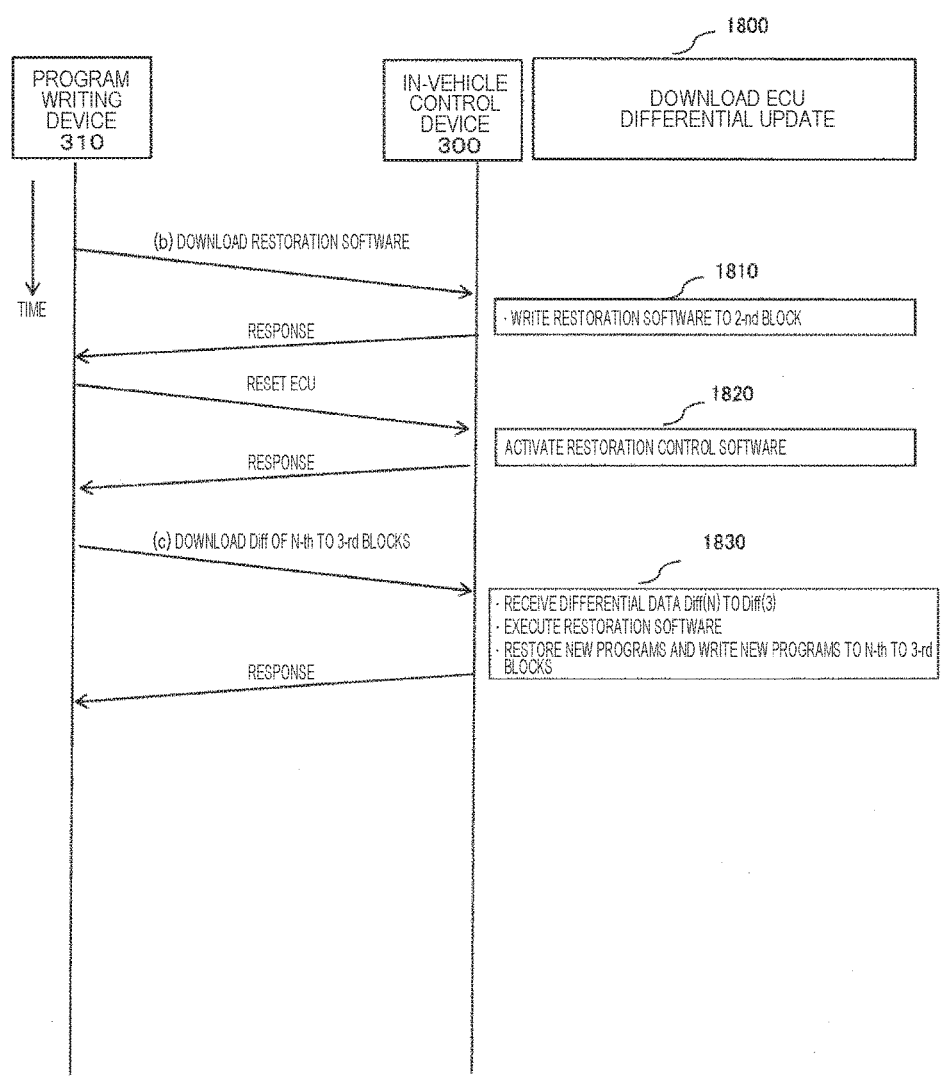
FIG. 18 is a flowchart illustrating a procedure of differential update of an ECU, in which the restoration recovery software is downloaded.

Even in an ECU has restoration software previously stored in a flash memory, the restoration software may have a defect. FIG. 18 is a flowchart for updating the restoration software in such case. Therefore, the ECU has a predetermined block in the flash memory for storing restoration software and restoration control software. In FIG. 18, first, processing 1810 of downloading the restoration software and writing restoration software to the 2-nd block is performed. Next, ECU is reset to execute the restoration control software 1820. Next, the encoded data of the N-th to 3-rd blocks Diff (N) to Diff (3) is downloaded. In 1830, the in-vehicle control device 300 executes the restoration control software and the downloaded restoration software to restore a new program using the differential data or the compressed data every time when the in-vehicle control device 300 receives the encoded data of one of Diff (N) to Diff (3), writes the new program to the corresponding one of the N-th to 3-rd blocks, and returns a response with an abnormality diagnosis code set.

Although this is a flowchart for sequentially updating the restoration software and encoded data as described above, it is of course possible to update only the restoration software.

In summary, the in-vehicle control device according to the present embodiment can be described as follows.

Provided is an in-vehicle control device capable of updating a program based on update content provided from an update tool, the in-vehicle control device being provided with a first memory provided with a plurality of blocks for storing the program and a second memory. When updating the program, differential data between the program and the update program is stored in the second memory, an update program for a block to be updated among the plurality of blocks is recreated in another block which is different from the block to be updated using the differential data and old programs before the update, and the update program recreated in the another block is written to the block to be updated.

From the viewpoint of the system, the above processing can be described as follows.

Provided is a program update system that updates a program installed in an in-vehicle control device based on update content provided from an update tool, the in-vehicle control device being provided with a first memory provided with a plurality of blocks for storing the program and a second memory. When updating the program, the update tool transmits differential data between the program and update program to the in-vehicle control device, and the in-vehicle control device stores the received differential data in the second memory, recreates the update program for a block to be updated among the plurality of blocks in another block that is different from the block to be updated using the differential data and old programs before the update, and writes the update program recreated in the another block to the block to be updated.

From the viewpoint of a method, the above processing can be described as follows.

Provided is a program update system that is a program update method that updates a program installed in an in-vehicle control device based on update content provided from an update tool, the in-vehicle control device being provided with a first memory provided with a plurality of blocks for storing the program and a second memory. The program update method includes a step of transmitting, by the update tool, differential data between the program and update program to the in-vehicle control device, and a step of storing, by the in-vehicle control device, the received differential data in the second memory, a step of reproducing, by the in-vehicle control device, the update program for a block to be updated among the plurality of blocks in another block that is different from the block to be updated using the differential data and old programs before the update, and a step of writing, by the in-vehicle control device, the update program recreated in the another block to the block to be updated.

Further, from the viewpoint of differential update software, the above processing can be described as follows.

Provided is program update software that causes a computing device mounted on an in-vehicle control device to update a program installed in the in-vehicle control device based on update content, the in-vehicle control device being provided with a first memory provided with a plurality of blocks for storing the program and a second memory. When updating the program, the program update software causes the computing device to recreate the update program for a block to be updated among the plurality of blocks in another block that is different from the block to be updated referring to differential data between the program and the update program from the second memory and referring to old programs before the update from the first memory, and write the update program recreated in the another block to the block to be updated.

As described in detail above, the entire of the present embodiment can be summarized again as follows. First, the present embodiment has two objects. The first object is to make it possible to achieve restoration processing of differential reprogramming even in an in-vehicle control device using a microcomputer with a large built-in flash memory using a small amount of RAM and composed of a plurality of blocks, and to enable restoration of a new program in a short time by decreasing the size of differential data even for a new program to which major changes have been made.

The second object is to provide means for differential update to a so-called existing in-vehicle control device or an existing ECU that does not have a differential update function. The existing in-vehicle control device means an in-vehicle control device such as a flash memory that includes a flash memory and a temporary storage used as a work area. The flash memory is composed of a non-rewritable area called a boot portion and a rewritable area called an application portion. In the non-rewritable area, at least initialization software, communication software for communication with a program rewriting device, flash writing software, and full-text update software using full-text are arranged. An object of the present embodiment is to provide an in-vehicle control device, a program update system, and program update software that achieve the above-described two objects.

One means for solving the problem of the present embodiment includes a first memory including a plurality of blocks for storing a program and a second memory for temporarily storing data, when updating the program, stores the differential data between the program and the update program in the second memory, restores/creates the update program for the block to be updated into another block different from the block to be updated using the stored differential data and the old program in the plurality of blocks before the update, and then copies the other block to the block to be updated. The point here is the size of the differential data can be decreased by restoring/generating a new program of a block to be updated referring to a plurality of successive old programs. Here, the new program is temporarily restored/generated in another block, and then copied to the block to be updated. Thus, the block is called a temporary block.

The second means for achieving the object of the present embodiment is achieved by an updating unit composed of three phases for differential update of an in-vehicle control device that does not have a differential update function, that is, an existing ECU. Needless to say, it is necessary to download restoration recovery software having a differential update function, but simply downloading only the differential update software is not enough. The restoring recovery software to be downloaded includes a communication function for receiving a communication command and differential data from the program writing device, a restoration function for restoring and generating a new program from the received differential data and old programs, a restoration control function for activating the restoring function by identifying the type of the communication command and writing the restored/generated new program to a block of an application portion, and the like. In addition, it is a point to download the restoration recovery software of such a configuration to the head of the application portion.

Further, it is assumed that the existing ECU has a flash memory configuration composed of a non-rewritable area called a boot portion and a rewritable area called an application portion, full-text update software using full-text data exists in the boot portion, and a program and data that can be updated are arranged in the application portion.

The updating unit composed of three phases will be described below.

In the first phase, the restoration recovery software is downloaded to the head of the application portion using the full-text update software existing in the existing ECU and the existing ECU is reset. In the second phase, the recovery restoration software is activated as application software to restore and generate a new program from the differential program and old programs by differential update, the block of the application portion is updated, and the existing ECU is reset. In the third phase, the new program is downloaded to the head of the application portion using the existing full-text update software. Although the basic concept for achieving the object has been described above, it will be described in more detail below.

In the first phase, the restoration recovery software is downloaded to the head of the application portion and the ECU is reset. In the second phase, the boot portion is executed immediately after the resetting. After the execution, the restoration recovery software arranged at the head of the application portion is executed. The recovery restoration software receives the differential data of the block to be updated, refers the old programs in the plurality of blocks of the application portion to restore/generate a new program into the temporary block, and thereafter copies the temporary block to the block to be updated. After completion of the restoration/generation and copying processing for all blocks to be updated, the ECU is reset. In the last third phase, the full-text update software of the boot portion writes the new program to the head of the application portion. By the above-described basic operation, new programs are written to all the blocks of the application portion.

According to the first means of this embodiment, old programs in a large area can be referred at the time of restoration even for a new program to which major changes have been made. As a result, the size of differential data can be decreased, and thus the restoration software of the in-vehicle control device can restore/generate a new program at high speed. Furthermore, the present embodiment has another big advantageous effect. If an unexpected event such as power shutdown occurs due to running out of the capacity of an in-vehicle battery during differential update, retry is possible. Since the block undergoing the differential update is the temporary block, the old program in the block to be updated remains as it is. Therefore, even if power shutdown occurs at this point, a new program can be restored/generated by referring to the old program again after the power supply is restored. Also, even if power shutdown occurs while copying the temporary block to the block to be updated, the new program remains in the temporary block although the old program in the block to be updated is destroyed halfway. Thus, the update can be completed by writing the new program to the block to be updated again. As described above, the means for restoring/generating a new program to the temporary block makes it possible to decrease the size of the differential data, and has advantage that a new program can be restored by retry even if an abnormality such as a power shutdown occurs.

According to the two means of the present embodiment, it is possible to update the in-vehicle control device at high speed even when the in-vehicle control device does not have the differential updating function. Thus, the present embodiment has an advantage that the range to be used for differential update of the in-vehicle control device can be greatly expanded.

As described above, there are three phases for differential update of an in-vehicle control device that does not have the differential updating function, that is, a so-called existing ECU.

In the existing ECU, the program in the boot portion is executed first. A diagnosis to check whether there is no abnormality in the memory of the microcomputer or there is no abnormality in the external circuit, for example is performed. If no abnormality is found as a result, the program in the application portion is executed. In a state where the program in the application portion is executed, the in-vehicle writing device can activate the full-text update software in the boot portion. That is, it is assumed that command processing to "activate full-text update software" already implemented in the existing ECU is already installed in the existing ECU. In the first phase, the existing ECU receives the command to "activate full-text update software" by using the full-text update software, downloads the restoration recovery software, and resets the ECU. In the second phase, after the execution of the boot portion, the software in the application portion, that is, the restoration recovery software is executed. The restoration recovery software is in a state waiting for a command from the in-vehicle writing device. In this state, normal program update is not possible. This is because the restoration recovery software is operating on the flash of the application portion, and the program update is processing of rewriting the flash, and thus, the program update causes the restoration recovery software to rewrite the restoration recovery software itself. Therefore, it is assumed that the flash memory can be rewritten only when a special command meaning, "rewrite the operating software itself" is received from the in-vehicle writing device. As described above, as long as restoration recovery software is located within the head block of the application portion or within the range of 2 to 3 adjacent blocks, most of the blocks of the other application portions can be rewritten by differential update. The point is differential update of blocks of the application portion except for a block in which the restoration recovery software is installed is performed in this way. The existing ECU is reset at the end of the second phase.

Finally, in the third phase, the restoration recovery software in the application portion is executed again after the boot portion is executed. Here, upon receipt of a command to "activate full-text update software" from the in-vehicle writing device, the full-text update software in the boot portion is activated. Utilizing the full-text update software, the block having the restoration recovery software already installed therein is full-text updated to a new program.

The point is, in the first and third phases, there is a command to "activate full-text update software" already installed in the existing ECU as described above, and thus full-text update is performed using the command, and in the second phase, the communication software which is a part of the restoration recovery software is operating, and this communication software receives the command to "rewrite the operating software itself" and performs differential update. The recovery software is configured such that it can receive such a new command.

Next, an embodiment in which the configuration of restoration recovery software to be downloaded to an already shipped in-vehicle control device is changed will be described.

FIG. 16 is a configuration diagram of a flash memory of the existing ECU. The flash memory configuration of the existing ECU has already been described in detail, but it will be described again. First, in Existing ECU Configuration (a), the flash memory is composed of a boot portion that is a program non-rewritable area and an application portion that is a program rewritable area. The boot portion has a program for initializing a memory and diagnosing whether the program is broken, full-text update software for updating an old program arranged in the application portion of the existing ECU, communication software for receiving an instruction command and a new program from the program writing device, and flash memory writing software for writing the new program in the application portion. Next, in the diagram of Restoration Recovery Software Download (b), the head of the application portion is the 2-nd block. This does not mean the head of physical arrangement, but means the head of the program of the application portion that is executed first from the boot portion. Here, the head of the 2-nd block is set as the head to branch from the boot portion to the application. That is, the block to which the differential recovery software is downloaded is the 2-nd block. This is because differential recovery software can be executed from the boot portion if the differential recovery software is downloaded here.

The diagram of the Differential Update (c) is a diagram in which the restoration recovery software is downloaded to the 2-nd block and written in the application portion of the flash memory. As described above, the flash memory is in a state where the old program in the 2-nd block is overwritten to the restoration recovery software. The diagram illustrates a state where the restoration recovery software is activated after the ECU is reset, receives the differential data, restore/generate a new program, and rewrites all the other blocks to new programs. The last diagram of Restoration Recovery Software Portion Update (d) illustrates a state where the 2-nd block has been rewritten to a new program by the full-text update software of the boot portion, and it can be seen that all the blocks have been rewritten to new programs. The flash memory configuration of the above-described existing ECU has been described in detail.

Next, with reference to FIG. 17, the restoration recovery software having a modified configuration will be described. First, the configuration of the restoration recovery software (b) includes four pieces of software that are restoration software for restoring/generating a new program using differential data and old programs arranged in the application portion of the flash memory, communication software for receiving a communication command, a differential instruction command, and the like from a program rewriting device in differential update or sending a response, restoration control software for activating the restoration software to restore/generate a new program and instruct writing of the generated new program for the application portion of the flash memory, and flash writing software for writing the new program to the flash memory. This is a configuration obtained by adding the flash rewriting software to configuration of the restoration recovery software that has been described.

The differential update of the existing ECU is executed in the following three phases. In Phase 1, the existing ECU receives the downloaded restoration recovery software (b) using the communication software of the boot portion and the full-text update software, writes the restoration recovery software to the 2-nd block in which the old program is arranged using the flash memory writing software of the boot portion, and resets the ECU. That is, this is processing of destroying the old program and writing the restoration recovery software.

In Phase 2, the existing ECU executes the restoration recovery software that has been downloaded to the 2-nd block of the application portion after executing the boot portion by the reset. First, the communication software, the flash writing software, and the like are initialized and set to be in an executable state. Next, the existing ECU executes the restoration control software to set it in a state waiting for a command from the program rewriting device. Next, upon receiving the differential data (Diff) of the (N)-th block to the 3-rd block (c) from the program rewriting device, the existing ECU activates the restoration software to perform differential update from the differential data of the (N)-th block to the 3-rd block and the old programs to restore/generate new programs, and write the new programs of the N-th to the 3-rd blocks to the N-th block to 3-rd block of the flash memory using the flash writing software. The existing ECU then resets itself.

In Phase 3, the existing ECU receives the new program for the 2-nd block (d) transmitted from the program writing device by using the communication software of the boot portion of the existing ECU and the full-text update software, writes the new program for the 2-nd block to the 2-nd block using the flash writing software of the boot portion, and resets the existing ECU. This means that the 2-nd block that has been destroyed by the recovery restoration software is rewritten to the new program.

As described above, in the differential updating method of the existing ECU composed of the three phases, the full-text updating processing is limited to twice (the phases 1 and 3) for the 2-nd block and differential update is possible for the 3-rd to the N-th blocks. Thus, high-speed rewriting can be expected.

Next, the processing of Phases 1 to 3 will be described collectively. Phase 1 is a phase for downloading the restoration recovery software to the existing ECU and to the head of the application portion. When a program update instruction is issued from the program rewriting device, the existing ECU first activates the existing full-text update software arranged in the boot portion. Next, when the differential recovery software is transferred from the program rewriting device to the application portion (2-nd block), the existing ECU receives the differential recovery software using the existing full-text update software of the boot portion. The differential recovery software received here is composed of four pieces of software that are restoration software for differential restoration, communication software operating in the application portion, restoration control software, and flash writing software. Next, the differential recovery software is written to the 2-nd block of the application portion by using the existing flash memory writing software of the boot portion. Then, the existing ECU is reset, and Phase 1 ends.

Next, Phase 2 will be described. After the reset, first, the program of the boot portion is executed. If the diagnostic processing of the boot portion results in normal, a program (restoration recovery software) arranged at the head of the application portion (the head of the 2-nd block) is executed. As the order of execution of the restoration recovery software, a communication unit of the communication software is firstly initialized and the communication software is executed. Next, the flash writing software is initialized, and the flash writing software is set to be in an executable state. Next, the restoration control software is executed. The detailed operation of the restoration control software will be described. First, the differential data Diff (N) to Diff (3) is received from the program rewriting device and from the communication software of the application portion. Next, the restoration software is executed to restore/generate the new programs for the N-th to the 3-rd blocks using Diff (N) to Diff (3) and the old programs arranged in the N-th to the 3-rd blocks, and the new programs are written to the N-th to the 3-rd blocks by using the flash writing software of the application portion. Next, the ECU is reset, and the phase 2 ends.

Finally, Phase 3 will be described. After the reset, similarly to Phase 2, the boot portion is executed and the restoration recovery software of the 2-nd block is then executed. When a program update instruction is issued from the program rewriting device, the existing ECU initializes and executes the communication software and the flash writing software, and activates the existing full-text update software arranged in the boot portion. Next, the new program for the 2-nd block transmitted from the program rewriting device is received by using the communication software of the boot portion. Next, the new program for the 2-nd block is written to the 2-nd block of the flash memory by using the flash writing software of the boot portion. Phase 3 ends.

All of the 2-nd to N-th blocks of the application portion have been rewritten to new programs. After reset of the ECU, the new program can be executed. The configuration obtained by adding the flash rewriting software to the restoration recovery software has been described in detail.

To summarize the above description, the in-vehicle control device and the program update software according to the present embodiment can be described as follows.

1. An in-vehicle control device capable of updating an old program stored therein to a new program based on update content provided from an update tool, the in-vehicle control device comprising:

a first memory that is nonvolatile and provided with a plurality of blocks for storing the program; and a second memory for temporarily storing data, wherein, the update tool transmits differential data generated using a new program of a block to be updated as an update target and an old program to the in-vehicle control device, and the in-vehicle control device includes a third unit configured to store the differential data in the second memory, and restore/generate the new program of the block to be updated in a temporary block that is different from the block to be updated using the differential data and the old program, and a fourth unit configured to write the new program restored/generated in the temporary block to the block to be updated after erasing the block to be updated, and the in-vehicle control device rewrites the first memory to a new program by repeating the third and fourth units for all blocks to be updated.

2. Program update software that causes a computing device mounted on an in-vehicle control device to update a stored old program to a new program based on update content provided from an update tool, wherein the in-vehicle control device includes: a first memory that is nonvolatile and provided with a plurality of blocks for storing the program; and a second memory for temporarily storing data, the update tool transmits differential data generated using a new program of a block to be updated as an update target and an old program to the in-vehicle control device, and the program update software includes a third unit configured to store the differential data in the second memory, restore/generate the new program of the block to be updated in a temporary block that is different from the block to be updated using the differential data and the old program, and a fourth unit configured to write the new program restored/generated in the temporary block to the block to be updated after erasing the block to be updated, and the program update software rewrites the first memory to a new program by repeating the third and fourth units for all blocks to be updated.

3. An in-vehicle control device capable of updating an old program stored therein to a new program based on update content provided from an update tool, the in-vehicle control device comprising:

a first memory that is nonvolatile and provided with a plurality of blocks for storing the program; and a second memory for temporarily storing data, wherein, the first memory is composed of a non-rewritable area and a rewritable area, in the non-rewritable area, a software having the update tool, a communication function for receiving a communication command and full-text data, a flash writing function for writing a program and data to the block, and a function for full-text update using the full-text data are arranged, in the rewritable area, a program and data that can be updated are arranged, and the program is updated in three phases: a first phase for writing restoration recovery software having the communication function, the restoration function, and the restoration control function to a head block of the writable area using software in the non-rewritable area; a second phase for activating the restoration recovery software to restore/generate a new program from the differential data and an old program of a block, and writing the new program to a block in the writable area; and a third phase for writing the new program of the block to the head block of the writable area.

4. Program update software that causes a computing device mounted in an in-vehicle control device to function to update a stored old program to a new program based on update content provided from an update tool, wherein the in-vehicle control device includes: a first memory that is nonvolatile and provided with a plurality of blocks for storing the program; and a second memory for temporarily storing data, the first memory is composed of a non-rewritable area and a rewritable area, in the non-rewritable area, a software having the update tool, a communication function for receiving a communication command and full-text data, a flash writing function for writing a program and data to the block, and a function for full-text update using the full-text data are arranged, in the rewritable area, a program and data that can be updated are arranged, and the program is updated in three phases: a first phase for writing restoration recovery software having the communication function, the restoration function, and the restoration control function to a head block of the writable area using software in the non-rewritable area; a second phase for activating the restoration recovery software to restore/generate a new program from the differential data and an old program of a block, and writing the new program to a block in the writable area; and a third phase for writing the new program of the block to the head block of the writable area.

5. An in-vehicle control device capable of updating an old program stored therein to a new program based on update content provided from an update tool, the in-vehicle control device comprising:

a first memory that is nonvolatile and provided with a plurality of blocks for storing the program; and a second memory for temporarily storing data, wherein, the first memory is composed of a non-rewritable area and a rewritable area, in the non-rewritable area, a software having the update tool, a communication function for receiving a communication command and full-text data, a flash writing function for writing a program and data to the block, and a function for full-text update using the full-text data are arranged, in the rewritable area, a program and data that can be updated are arranged, software having a function for full-text update in the non-rewritable area, upon receipt of restoration recovery software having a communication function for receiving a communication command and differential data from the update tool, a restoration function for restoring and generating a new program from the received differential data and a program of the block, a flash writing function for writing the new program to the block, and a restoration control function for writing the new program restored/generated by the restoration function to the block by identifying a type of the communication command, writes the restoration recovery software to a head of the rewritable area using flash writing function of the non-rewritable area, and resets the in-vehicle control device to reboot it, the update tool transmits differential data generated from a new program of a block to be updated and old programs of a plurality of blocks to the in-vehicle control device after the reboot, the in-vehicle control device includes a fifth unit configured to activate the restoration recovery software to restore/generate a new program using the differential data and the old programs and a sixth unit configured to write the new program to the block to be updated, updates the block to be updated in the rewritable area to a new program by repeatedly executing the fifth and sixth units, and resets the in-vehicle control device to reboot it, and the software having a function for full-text update in the non-rewritable area updates the rewritable area to a new program by writing the new program to the head block using the flash writing function of the non-rewritable area upon receipt of the new program of the head block of the rewritable area in which the restoration recovery software is arranged by the communication function in the non-rewritable area.

6. Program update software that causes a computing device mounted on an in-vehicle control device to update an old program stored therein to a new program based on update content provided from an update tool, wherein the in-vehicle control device includes: a first memory that is nonvolatile and provided with a plurality of blocks for storing the program; and a second memory for temporarily storing data, the first memory is composed of a non-rewritable area and a rewritable area, in the non-rewritable area, a software having the update tool, a communication function for receiving a communication command and full-text data, a flash writing function for writing a program and data to the block, and a function for full-text update using the full-text data are arranged, in the rewritable area, a program and data that can be updated are arranged, software having a function for full-text update in the non-rewritable area, upon receipt of restoration recovery software having a communication function for receiving a communication command and differential data from the update tool, a restoration function for restoring and generating a new program from the received differential data and a program of the block, a flash writing function for writing the new program to the block, and a restoration control function for writing the new program restored/generated by the restoration function to the block by identifying a type of the communication command, writes the restoration recovery software to a head of the rewritable area using flash writing function of the non-rewritable area, and resets the in-vehicle control device to reboot it, the update tool transmits differential data generated from a new program of a block to be updated and old programs of a plurality of blocks to the in-vehicle control device after the reboot, the in-vehicle control device includes a fifth unit configured to activate the restoration recovery software to restore/generate a new program using the differential data and the old programs and a sixth unit configured to write the new program to the block to be updated, updates the block to be updated in the rewritable area to a new program by repeatedly executing the fifth and sixth units, and resets the in-vehicle control device to reboot it, and the software having a function for full-text update in the non-rewritable area updates the rewritable area to a new program by writing the new program to the head block using the flash writing function of the non-rewritable area upon receipt of the new program of the head block of the rewritable area in which the restoration recovery software is arranged by the communication function in the non-rewritable area.

REFERENCE SIGNS LIST

1 PC
2 server
3 in-vehicle system
100 program generating device
101 computing device
102 input device
103 display device
104 communication device
105 storage device
201 computing device
202 input device
203 display device
204 communication device
205 storage device
300 ECU (in-vehicle control device)
301 microcomputer (computing device)
302 SRAM (volatile memory)
302a first area of SRAM
302b second area of SRAM
303 FLASH memory (nonvolatile memory)
304 various ICs
305 communication device
310 gateway (program writing device)
311 microcomputer
312 SRAM
313 FLASH memory
314 various ICs
315 communication device (CAN protocol)
316 communication device (protocol of network outside the vehicle)
700 encoding control software
710 type instruction information INST
715 temporary block number K
720 old programs OLD (n), n=1 to N
725 new programs NEW (n), n=1 to N
800 encoding software
810 type instruction Gen
820 old programs OldB of a plurality of blocks including a block to be updated
830 new programs NewB of a block to be updated
900 communication software of PC
1000 communication software of server
1100 communication software of program writing device
1300 restoration recovery software
1400 restoration control software
1500 restoration software

The invention claimed is:

1. An in-vehicle control device capable of updating an old program stored therein to a new program based on update content provided from an update tool, the in-vehicle control device comprising:

a first memory that is nonvolatile and provided with a plurality of blocks for storing the old program; and a second memory for temporarily storing data, wherein, the update tool transmits differential data between the new program of a block to be updated as an update target and old programs of a plurality of blocks including the block to be updated to the in-vehicle control device, the in-vehicle control device stores the differential data in the second memory, recreates the new program of the block to be updated in another block that is different from the block to be updated using the differential data and the old programs stored in the plurality of blocks including the block to be updated, and writes the new program recreated in the another block to the block to be updated after erasing the block to be updated;

the first memory is composed of a non-rewritable area and a rewritable area;

in the non-rewritable area, update software is arranged;

in the rewritable area, the old program and data that can be updated are arranged;

upon receipt of restoration recovery software from the non-rewritable area, the update software controls writing of the restoration recovery software to the head of the rewritable area, updates the rewritable area to the new program, and resets the in-vehicle control device to reboot it; and the update tool transmits the differential data to the in-vehicle control device after the reboot.

2. The in-vehicle control device according to claim 1, wherein after completion of update of all blocks to be updated, the in-vehicle control device receives compressed data obtained by compressing the new program for the another block transmitted from the update tool, stores the compressed data in the second memory, decompresses the compressed data, and writes the new program to the another block.

3. The in-vehicle control device according to claim 1, wherein the old programs of the plurality of blocks including the block to be updated are old programs of sequential blocks that are adjacent to the block to be updated and have upper addresses.

4. An in-vehicle control system capable of updating an old program stored in an in-vehicle control device to a new program based on update content provided from an update tool, the in-vehicle control system comprising:
a first memory that is nonvolatile and provided with a plurality of blocks for storing the old program; and a second memory for temporarily storing data, wherein, the update tool transmits differential data between the new program in a block to be updated as an update target and old programs in a plurality of blocks including the block to be updated to the in-vehicle control device,
the in-vehicle control device stores the differential data in the second memory, recreates the new program of the block to be updated in another block that is different from the block to be updated using the differential data and the old programs stored in the plurality of blocks including the block to be updated, and writes the new program recreated in the another block to the block to be updated after erasing the block to be updated;
the first memory is composed of a non-rewritable area and a rewritable area;
in the non-rewritable area, update software is arranged;
in the rewritable area, the old program and data that can be updated are arranged;
upon receipt of restoration recovery software from the non-rewritable area, the update software controls writing of the restoration recovery software to the head of the rewritable area, updates the rewritable area to the new program, and resets the in-vehicle control device to reboot it; and
the update tool transmits the differential data to the in-vehicle control device after the reboot.

5. A non-transitory computer-readable storage medium that stores program update software that causes a computing device mounted on an in-vehicle control device to function to update an old program stored in the in-vehicle control device to a new program based on update content provided from an update tool, wherein
the in-vehicle control device includes: a first memory that is nonvolatile and provided with a plurality of blocks for storing the old program; and a second memory for temporarily storing data,
the update tool transmits differential data between the new program in a block to be updated as an update target and the old program in a plurality of blocks including the block to be updated to the in-vehicle control device,
the non-transitory computer-readable storage medium that stores the program update software causes the computing device to store the differential data in the second memory, recreate the new program of the block to be updated in another block that is different from the block to be updated using the differential data and the old programs stored in the plurality of blocks including the block to be updated, and write the new program recreated in the another block to the block to be updated after erasing the block to be updated;
the first memory is composed of a non-rewritable area and a rewritable area;
in the non-rewritable area, the program update software is arranged;
in the rewritable area, the old program and data that can be updated are arranged;
upon receipt of restoration recovery software from the non-rewritable area, the program update software controls writing of the restoration recovery software to the head of the rewritable area, updates the rewritable area to the new program, and resets the in-vehicle control device to reboot it; and
the update tool transmits the differential data to the in-vehicle control device after the reboot.

6. The non-transitory computer-readable storage medium that stores program update software according to claim 5, wherein after completion of update of all blocks to be updated, the non-transitory computer-readable storage medium that stores program update software causes the computing device to receive compressed data obtained by compressing the new program for the another block transmitted from the update tool, store the compressed data in the second memory, decompress the compressed data, and write the new program to the another block.

7. An in-vehicle control device capable of updating an old program stored therein to a new program based on update content provided from an update tool, the in-vehicle control device comprising:
a first memory that is nonvolatile and composed of a plurality of blocks for storing the old program; and a second memory for temporarily storing data, the second memory including a first area which, upon receipt of the new program or data, temporarily stores the new program or data, and thereafter writes the new program or data to the nonvolatile first memory, wherein
the update tool transmits restoration recovery software having an updating function by differential or compression to the in-vehicle control device, and then transmits differential data between the new program in a block to be updated as an update target and the old program in a plurality of blocks including the block to be updated to the in-vehicle control device,
the in-vehicle control device performs program update composed of a first step of, upon receipt of the restoration recovery software, writing the restoration recovery software to a predetermined block in the nonvolatile first memory, and a second step of executing the restoration recovery software, upon receipt of the differential data, storing the differential data in the second memory, reproducing in another block that is different from the block to be updated using the differential data and the old program stored in the plurality of blocks including the block to be updated, and writing the new program recreated in the another block to the block to be updated after erasing the block to be updated;
the first memory is composed of a non-rewritable area and a rewritable area;
in the non-rewritable area, update software is arranged;
in the rewritable area, the old program and data that can be updated are arranged;
upon receipt of the restoration recovery software from the non-rewritable area, the update software controls writing of the restoration recovery software to the head of the rewritable area, updates the rewritable area to the new program, and resets the in-vehicle control device to reboot it; and
the update tool transmits the differential data to the in-vehicle control device after the reboot.

8. The in-vehicle control device according to claim 7, wherein after completion of update of all blocks to be updated, the in-vehicle control device receives compressed data obtained by compressing the new program for the another block transmitted from the update tool, stores the compressed data in the second memory, decompresses the compressed data, executes the restoration recovery software, and writes the new program to the another block.

9. A non-transitory computer-readable storage medium that stores program update software that causes a computing device mounted on an in-vehicle control device to function to update an old program stored in the in-vehicle control device to a new program based on update content provided from an update tool, wherein
the in-vehicle control device includes: a first memory that is nonvolatile and includes a plurality of blocks for storing the old program; and a second memory for temporarily storing data, the second memory including a first area which, upon receipt of the new program or data, temporarily stores the new program or data, and thereafter writes the new program or data to the nonvolatile first memory, wherein
the update tool transmits restoration recovery software having an updating function by differential or compression to the in-vehicle control device, and then transmits differential data between the new program in a block to be updated and the old program in a plurality of blocks including the block to be updated to the in-vehicle control device,
the non-transitory computer-readable storage medium that stores the program update software causes the computing device to perform a first step of, upon receipt of the restoration recovery software, writing the restoration recovery software to a predetermined block in the nonvolatile first memory, and a second step of executing the restoration recovery software, upon receipt of the differential data, storing the differential data in the second memory, reproducing in another block that is different from the block to be updated using the differential data and the old program stored in the plurality of blocks including the block to be updated, and writing the new program recreated in the another block to the block to be updated after erasing the block to be updated;
the first memory is composed of a non-rewritable area and a rewritable area;
in the non-rewritable area, the program update software is arranged;
in the rewritable area, the old program and data that can be updated are arranged;
upon receipt of the restoration recovery software from the non-rewritable area, the update software controls writing of the restoration recovery software to the head of the rewritable area, updates the rewritable area to the new program, and resets the in-vehicle control device to reboot it; and
the update tool transmits the differential data to the in-vehicle control device after the reboot.

10. The non-transitory computer-readable storage medium that stores program update software according to claim 9, wherein after completion of update of all blocks to be updated, the non-transitory computer-readable storage medium that stores program update software causes the computing device to receive compressed data obtained by compressing the new program for the another block transmitted from the update tool, store the compressed data in the second memory, execute the restoration recovery software, decompress the compressed data, and write the new program to the another block.

11. An in-vehicle control device capable of updating an old program stored therein to a new program based on update content provided from an update tool, the in-vehicle control device comprising:
a first memory that is nonvolatile and composed of a plurality of blocks for storing the old program; and a second memory for temporarily storing data, the second memory including a first area which, upon receipt of the new program or data, temporarily stores the new program or data, and thereafter writes the new program or data to the nonvolatile first memory, wherein
the update tool transmits restoration recovery software having an updating function by differential or compression and a communication function for differential data of compressed data to the in-vehicle control device, then transmits the differential data between the new program in a block to be updated as a target and the old program in a plurality of blocks including the block to be updated to the in-vehicle control device, and then transmits the new program in a predetermined block,
the in-vehicle control device performs program update composed of a first step of, upon receipt of the restoration recovery software, writing the restoration recovery software to a predetermined block in the nonvolatile first memory, a second step of executing the communication function of the restoration recovery software, upon receipt of the differential data, storing the differential data in the second memory, executing the updating function of the restoration recovery software to restore the new program of the block to be updated in another block that is different from the block to be updated using the differential data and the old stored in the plurality of blocks including the block to be updated as input, and writing the new program recreated in the another block to the block to be updated after erasing the block to be updated, and a third step of, upon receipt of the new program of the predetermined block, writing the new program to the predetermined block of the nonvolatile first memory;
the first memory is composed of a non-rewritable area and a rewritable area;
in the non-rewritable area, update software is arranged;
in the rewritable area, the old program and data that can be updated are arranged;
upon receipt of the restoration recovery software from the non-rewritable area, the update software controls writing of the restoration recovery software to the head of the rewritable area, updates the rewritable area to the new program, and resets the in-vehicle control device to reboot it; and
the update tool transmits the differential data to the in-vehicle control device after the reboot.

12. The in-vehicle control device according to claim 11, wherein after completion of update of the block to be updated by using differential data, the update tool transmits compressed data obtained by compressing the new program for the another block, the in-vehicle control device receives the compressed data and stores the compressed data in the second memory, and the restoration recovery software decompresses the compressed data and writes the new program to the another block.

13. A non-transitory computer-readable storage medium that stores program update software capable of updating an old program stored in an in-vehicle control device to a new program based on update content provided from an update tool, wherein
the in-vehicle control device includes: a first memory that is nonvolatile and composed of a plurality of blocks for storing the old program; and a second memory for temporarily storing data, the second memory including a first area which, upon receipt of the new program or data, temporarily stores the new program or data, and to thereafter writes the new program or data to the nonvolatile first memory, the update tool transmits restoration recovery software having an updating function by differential or compression and a communication function for differential data of compressed data to the in-vehicle control device, then transmits the differential data between the new program in a block to be updated as a target and the old program in a plurality of blocks including the block to be updated to the in-vehicle control device, and then transmits the new program in a predetermined block, the non-transitory computer-readable storage medium that stores program update software causes the computing device to perform a first step of, upon receipt of the restoration recovery software, writing the restoration recovery software to a predetermined block in the nonvolatile first memory, a second step of executing the communication function of the restoration recovery software, upon receipt of the differential data, storing the differential data in the second memory, executing the updating function of the restoration recovery software to restore the new program of the block to be updated in another block that is different from the block to be updated using the differential data and the old program stored in the plurality of blocks including the block to be updated as input, and writing the new program recreated in the another block to the block to be updated after erasing the block to be updated, and a third step of, upon receipt of the new program of the predetermined block, writing the new program to the predetermined block of the nonvolatile first memory;

the first memory is composed of a non-rewritable area and a rewritable area;

in the non-rewritable area, update software is arranged;

in the rewritable area, the old program and data that can be updated are arranged;

upon receipt of the restoration recovery software from the non-rewritable area, the update software controls writing of the restoration recovery software to the head of the rewritable area, updates the rewritable area to the new program, and resets the in-vehicle control device to reboot it; and the update tool transmits the differential data to the in-vehicle control device after the reboot.

14. The non-transitory computer-readable storage medium that stores program update software according to claim 13, wherein after completion of update of the block to be updated by using differential data, the update tool transmits compressed data obtained by compressing the new program for the another block, and the non-transitory computer-readable storage medium that stores program update software causes the computing device to store the received compressed data in the second memory, execute the restoration recovery software, decompress the compressed data, and write the new program to the another block.

15. The device of claim 1, wherein the second memory includes a first area configured to store the differential data, and wherein the nonvolatile first memory stores a restoration recovery software that is configured to restore/generate the new program of the block to be updated in a temporary block that is different from the block to be updated using the differential data and an old program, write the new program restored/generated in the temporary block to the block to be updated after erasing the block to be updated, and rewrite the first memory to the new program repeatedly for all blocks to be updated.

16. The device of claim 1, wherein the first memory is composed of the non-rewritable area and the rewritable area, in the non-rewritable area, software having the update tool, communication function for receiving a communication command and full-text data, flash writing function for writing the new program and data to a block, and function for full-text update using the full-text data is arranged, in the rewritable area, the old program and data that can be updated are arranged, and the old program is updated in three phases, the three phases including:

a first phase for writing restoration recovery software having the communication function, restoration function, and restoration control function to a head block of the writable area using software in the non-rewritable area;

a second phase for activating the restoration recovery software to restore/generate the new program from differential data and the old program of a block, and writing the new program to a block in the writable area; and a third phase for writing the new program of the block to the head block of the writable area using software in the non-rewritable area.

17. The device of claim 7, wherein the restoration recovery software includes the following functions a to d:

a. a communication function for receiving a communication command;
b. a recreating function for recreating the new program;
c. a flash writing function for writing the new program to a block; and
d. a restoration control function for writing the new program to the block by identifying a type of the communication command.

* * * * *

UNITED STATES PATENT AND TRADEMARK OFFICE
CERTIFICATE OF CORRECTION

PATENT NO. : 10,430,176 B2
APPLICATION NO. : 15/757194
DATED : October 1, 2019
INVENTOR(S) : Kenichi Kurosawa et al.

Page 1 of 1

It is certified that error appears in the above-identified patent and that said Letters Patent is hereby corrected as shown below:

On the Title Page

Delete Item No. (63), "Related to U.S. Application Data".

Signed and Sealed this
Third Day of March, 2020

Andrei Iancu
*Director of the United States Patent and Trademark Office*